United States Patent [19]

Grant et al.

[11] Patent Number: 5,606,666
[45] Date of Patent: Feb. 25, 1997

[54] METHOD AND APPARATUS FOR DISTRIBUTING CONTROL MESSAGES BETWEEN INTERCONNECTED PROCESSING ELEMENTS BY MAPPING CONTROL MESSAGES OF A SHARED MEMORY ADDRESSABLE BY THE RECEIVING PROCESSING ELEMENT

[75] Inventors: Carl H. Grant; Jace W. Krull; Charles E. Kuhlmann, all of Boca Raton, Fla.; Shahram Salamian, Austin, Tex.; Eugene M. Thomas, Clermont; James T. Tsevdos, Ft. Lauderdale, both of Fla.

[73] Assignee: International Business Machines Corporation, Armonk, N.Y.

[21] Appl. No.: 277,394

[22] Filed: Jul. 19, 1994

[51] Int. Cl.⁶ .................................................. G06F 13/00
[52] U.S. Cl. ...................... 395/200.08; 395/412; 395/434
[58] Field of Search .......................... 395/200.13, 200.08, 395/412, 434; 364/200

[56]     References Cited

U.S. PATENT DOCUMENTS

| | | | |
|---|---|---|---|
| 3,657,736 | 4/1972 | Boom et al. | 340/172.5 |
| 4,414,620 | 11/1983 | Tsuchimoto et al. | 364/200 |
| 4,482,956 | 11/1984 | Tallman | 364/300 |
| 4,503,499 | 3/1985 | Mason et al. | 364/200 |
| 4,530,051 | 7/1985 | Johnson et al. | 364/200 |
| 4,630,196 | 12/1986 | Bednar, Jr. et al. | 364/200 |
| 4,694,396 | 9/1987 | Weisshaar et al. | 364/300 |
| 4,757,446 | 7/1988 | Trottier et al. | 364/200 |
| 4,777,595 | 10/1988 | Shecker et al. | 364/200 |
| 4,807,111 | 2/1989 | Cohen et al. | 364/200 |
| 4,831,541 | 5/1989 | Eshel | 364/200 |
| 4,851,988 | 7/1989 | Trottier et al. | 364/200 |
| 4,853,843 | 8/1989 | Ecklund | 364/200 |
| 4,924,384 | 5/1990 | Hao et al. | 364/200 |
| 4,937,734 | 6/1990 | Bechtolsheim | 364/200 |
| 4,953,078 | 8/1990 | Petit | 364/200 |

(List continued on next page.)

FOREIGN PATENT DOCUMENTS

| | | |
|---|---|---|
| 1254620 | 5/1989 | Canada . |
| 0205948A2 | 5/1986 | European Pat. Off. . |
| 0603994A2 | 8/1993 | European Pat. Off. . |
| 57-154690 | 9/1982 | Japan . |
| 63-129456 | 6/1988 | Japan . |

OTHER PUBLICATIONS

Threading the OS/2 Needle, *Computer Language*, Jul. 1988, pp. 34–40.

Distributed Processing: The State of the Art, *BYTE*, Nov. 1987, pp. 291–297.

*Primary Examiner*—Thomas C. Lee
*Assistant Examiner*—Duo Chen
*Attorney, Agent, or Firm*—George E. Grosser; John A. Kastelic

[57]     ABSTRACT

A computer system is provided in which asynchronously operating processing elements in the system are connected by means of an interconnection media so as to permit communication between an executing program on one of the processing elements with the memory on another processing element. Inter-processing communication logic located on each of the processing elements permits communication between executing programs on any one processing element. Inter-delivery support hardware is provided for interfacing between the interconnection media and the inter-processing communication logic. The inter-delivery support hardware operates asynchronously with respect to the executing programs on the processing elements for (i) enqueuing control elements obtained by a function on a first processing element from physical memory on the first processing element; (ii) temporarily storing the enqueued control elements in a first memory device associated with the first processing element; (iii) copying over the interconnection media via a copy transaction the temporarily stored control elements from the first memory device to a second memory device associated with a second processing element; and (iv) dequeuing the copied control elements from the second memory device to physical memory on the second processing element.

18 Claims, 17 Drawing Sheets

U.S. PATENT DOCUMENTS

| | | | |
|---|---|---|---|
| 4,956,771 | 9/1990 | Neustaedter | 364/200 |
| 4,991,089 | 2/1991 | Shorter | 364/200 |
| 5,016,163 | 5/1991 | Jesshope et al. | 364/200 |
| 5,050,070 | 9/1991 | Chastain et al. | 364/200 |
| 5,063,500 | 5/1991 | Shorter | 395/200 |
| 5,072,371 | 12/1991 | Benner et al. | 395/200 |
| 5,072,373 | 12/1991 | Dann | 395/200 |
| 5,161,215 | 11/1992 | Kouda et al. | 395/250 |
| 5,185,862 | 2/1993 | Bonevento et al. | 395/275 |
| 5,287,456 | 2/1994 | Rhodes et al. | 395/200 |
| 5,325,492 | 6/1994 | Bonevento et al. | 395/325 |
| 5,369,749 | 11/1994 | Baker et al. | 395/325 |
| 5,390,316 | 2/1995 | Cramer et al. | 395/425 |
| 5,448,708 | 9/1995 | Ward | 395/200.13 |

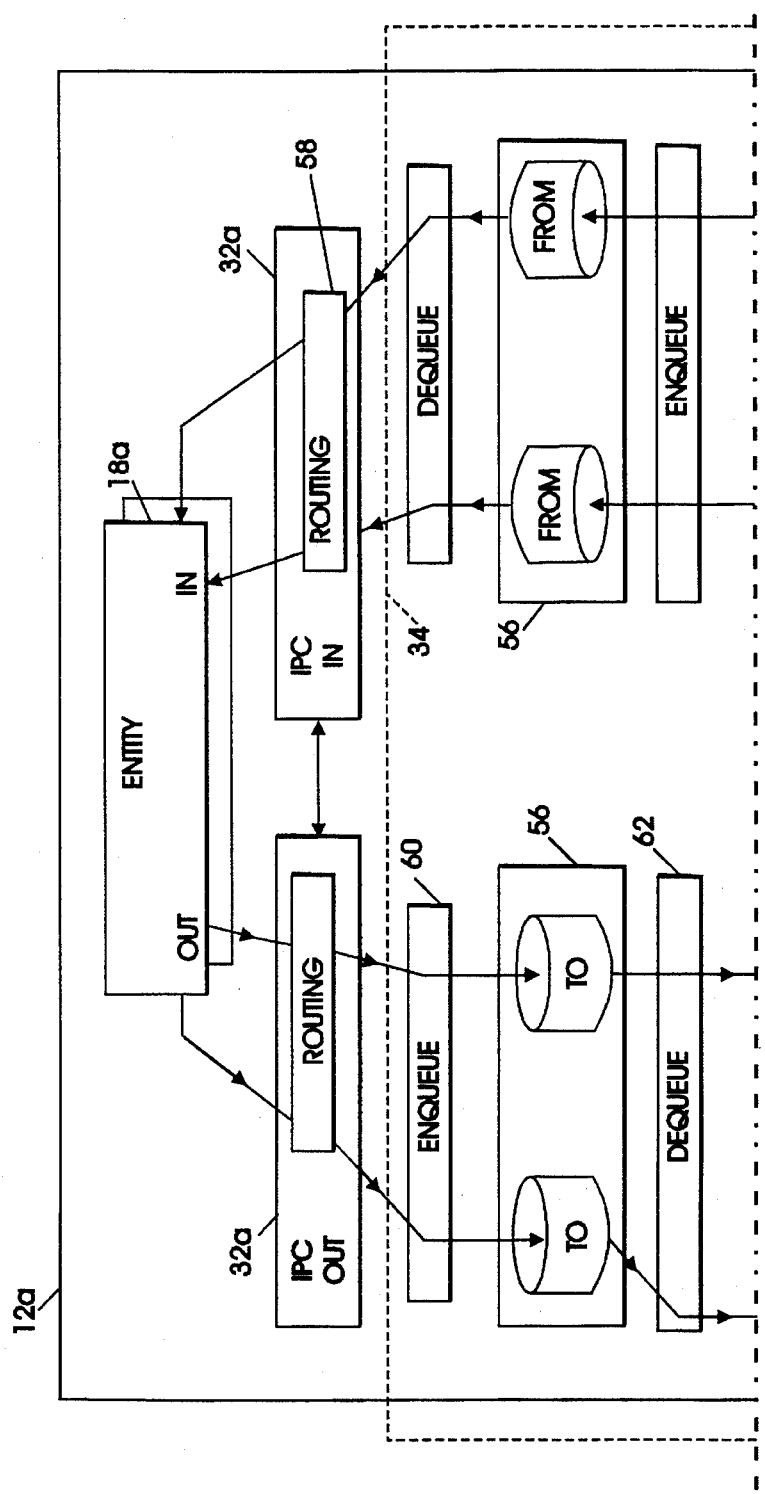

| PIPE ADDRESS (BASE) ||
|---|---|
| ENQUEUE STATUS (ES) | WRAP ELEMENT OFFSET (WE) |
| END OF FREE SPACE (EF) | START OF FREE SPACE (SF) |
| OFFSET TO TOP (TOP) | OFFSET TO END (END) |

| PIPE ADDRESS (BASE) ||
|---|---|
| DEQUEUE STATUS (DS) | WRAP ELEMENT OFFSET (WE) |
| END OF ELEMENTS (EE) | START OF ELEMENTS (SE) |
| OFFSET TO TOP (TOP) | OFFSET TO END (END) |

68

| 3 3 2 2 2 2 2 2 2 2 2 2 1 1 1 1 1 1 1 1 1 1 | | | | | | |
|---|---|---|---|---|---|---|
| 1 0 9 8 7 6 5 4 3 2 1 0 9 8 7 6 5 4 3 2 1 0 9 8 7 6 5 4 3 2 1 0 | | | | | | |
| RESERVED | D | RESERVED | RESERVED | M | RESERVED | E |
| \| DEQUEUE \| | | | \|MANAGEMENT \| | | ENQUEUE \| | |

METHOD AND APPARATUS FOR DISTRIBUTING CONTROL MESSAGES BETWEEN INTERCONNECTED PROCESSING ELEMENTS BY MAPPING CONTROL MESSAGES OF A SHARED MEMORY ADDRESSABLE BY THE RECEIVING PROCESSING ELEMENT

RELATED APPLICATION

"Method and Apparatus for Distributing Data Between Interconnected Processing Elements," Application Ser. No. 08/277,541 concurrently filed on Jul. 19, 1994, now abandoned.

FIELD OF THE INVENTION

The present invention relates generally to computer systems and more specifically to computer logic in the form of hardware support for delivering control messages between functional entities on separate loosely interconnected processing elements in a distributed operating system.

BACKGROUND OF THE INVENTION

As the numbers of computers and computer users have grown, the demand for communication between users and machines has correspondingly increased. Computer networks which permit such communication have been constructed which comprise more than one processing element. The processing elements may, for example, include portable or laptop computers, personal computers, minicomputers, or the subsystems internal to each of these types of computers. Typically, each of these processing elements operates asynchronously and independently of others in the network, but is able to communicate with the other processing elements in the network.

Asynchronously operating individual processing elements which are connected to each other in a network may together provide the capability of performing parallel processing. During parallel processing, two or more processes, or functional entities, may be executed concurrently by interconnected processing elements to simultaneously process a large number of tasks.

Connectivity among processing elements in parallel processing networks varies considerably between networks. In some networks, each of the processing elements is connected with every other processing element. In others, only neighboring processors are connected. The media through which the individual processing elements in a network are connected also varies among networks. Some networks capable of parallel processing are built around a bus architecture, in which each of the processing elements is connected to bus over which communications take place. Any one processing element may access memory in another processing unit by accessing and taking control of the bus. In this manner, information may be passed from processing element to processing element via memory which is located on the processing elements or on expansion memory within the system.

Networks built around a bus architecture are typically referred to as tightly coupled, since each processing element in the system is directly coupled to the bus. Because of the potential for synchronization errors in such a system, a bus access control mechanism must be provided to arbitrate between processing elements competing for control of the bus. The bus control mechanism must also ensure that a recipient processing element cannot read before a sending processing element has sent its message, and so that the sending processing element does not begin writing until the recipient has read the last information written.

Loosely coupled systems comprise more than one processing element which include connection by a serial form of interconnection which does not permit one processing element from directly accessing memory on another processing element. Loosely coupled systems, however, permit coprocessing by each of the processing elements concurrently, and further permit message passing. Messages are passed between the processing elements using a protocol which is mutually agreeable to the processing elements. Because of the uncertainty associated with network communications, it is the duty of both the sending and receiving processing elements to confirm the integrity of the communications link. Thus, the protocol typically incorporates an error-detection method. The protocol must also specify the manner in which to initiate and terminate the communications channel. As it is possible that more than one channel may be open at any one time, some form of message differentiation must also be incorporated.

The processing elements in a computer system such as a loosely coupled network may each include more than one active entity or function for performing one or more programs, and associated support hardware. The programs include tasks or instructions suitable for processing by the processor. The programs run applications or input/output (I/O) support, and operate on separate process execution threads. Generally, these programs may communicate with other programs on the same processing element by means of interprocess communications (IPC) software. Communications between programs on loosely coupled separate processing elements, however continues to present design difficulties.

It is an object of the present invention, then to provide logic in the form of hardware support that interfaces between IPC software and the interconnect media in a loosely connected computer system. The hardware support permits individually executing functions on asynchronously operating processing elements within the system to indirectly communicate with memory on other processing elements within the system.

SUMMARY OF THE INVENTION

The present invention provides a mechanism for distributing control messages between interconnected processing elements in a computer system. The processing elements each perform one or more functions through the execution of one or more programs. Each of the programs operates asynchronously with respect to executing programs on other processing elements in the system.

The computer system further comprises (i) interconnection media (such as a local area network (LAN), a serial digital switching network, or a parallel computer bus) for interconnecting the plurality of processing elements, (ii) inter-processing communication logic located on each of the processing elements for permitting communication between executing programs on any one of the processing elements, and (iii) inter-delivery support hardware for interfacing between the interconnection media and the inter-processing communication logic.

The inter-delivery support hardware operates asynchronously with respect to the executing programs on the processing elements to (i) enqueue control elements obtained by a function on a first processing element from physical memory on the first processing element, (ii) temporarily store the enqueued control elements in a first memory device associated with the first processing element, (iii) copy over the interconnection media, via a copy transaction, the temporarily stored control elements from the first memory device to a second memory device associated with a second processing element, and (iv) dequeue the copied control elements from the second memory device to physical memory on the second processing element.

The inter-delivery support hardware on each processing element includes (i) the physical memory which is addressable only by functions operating on the processing element on which the physical memory is located, (ii) the memory device for temporarily storing the enqueued control elements and (iii) delivery addressable space to which the temporarily stored control elements are mapped prior to being copied over the interconnection media. The delivery addressable space is addressable only by the inter-delivery support over the interconnect media to another processing element.

The first and second memory devices in which the control messages are temporarily stored are FIFO buffers. A FIFO buffer is provided for each of the other processing elements in the system. Each of the FIFO buffers including one first-in, first-out pipe for temporarily storing incoming control elements and one first-in, first-out pipe for temporarily storing outgoing control elements. The inter-delivery support hardware continuously scans the FIFO buffers for control elements stored therein.

BRIEF DESCRIPTION OF THE DRAWINGS

FIGS. 7A through 7C, taken together, form a detailed schematic illustrating the flow paths of control messages between interconnected processing elements;

FIG. 13 illustrates the structure of the enqueue control area of FIGS. 11 and 12;

FIG. 14 illustrates the structure of the dequeue control area of FIGS. 11 and 12;

DETAILED DESCRIPTION OF THE PREFERRED EMBODIMENT

Figure 1:
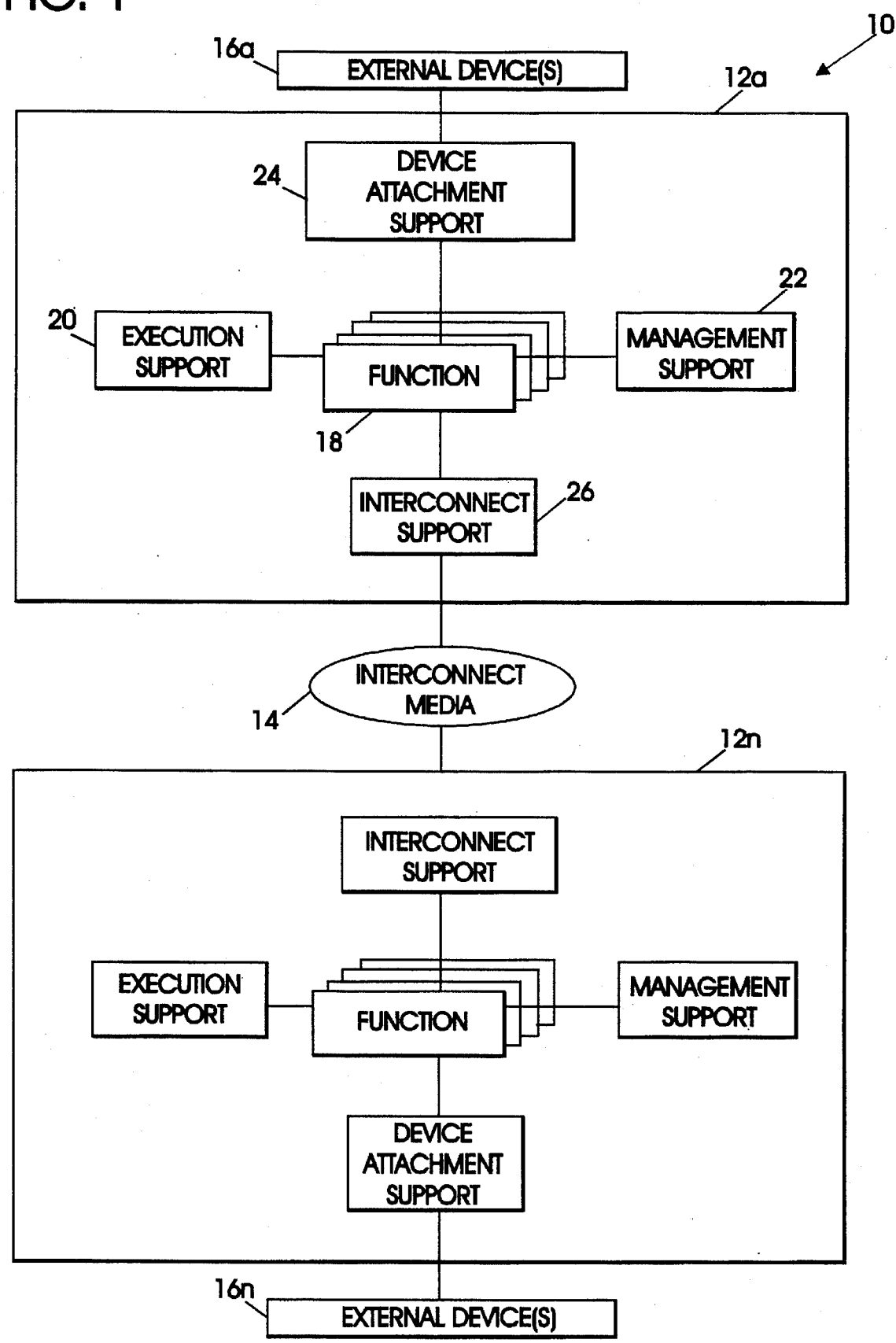
FIG. 1 is a block diagram of a computer system architected according to the principles of the present invention.

FIG. 1 is a block diagram of a computer system 10 architected according to the principles of the present invention. The system 10 comprises a plurality of processing elements 12 interconnected by interconnect media 14. Although only two processing elements are shown in FIG. 1 for simplicity (12a and 12n), the system may be implemented by interconnecting more than two processing elements via the interconnect media 14. The system may also include optional external devices 16a–16n which are connected directly to the individual processing elements 12a–12n.

The processing elements 12 in the system 10 may be either a personal computer or another type of processor. Each of the processing elements 12a–12n includes a function or active entity 18 for performing one or more programs, and associated support hardware for enhancing the operation of these active entities. The active entity includes tasks or processes which are programmed within each processing element to run applications or input/output (I/O) support. The support hardware includes execution support 20, management support 22, device attachment support 24 and interconnect support 26. The support hardware may be implemented on the processing elements 12 themselves or on separate cards which connect to the interconnect media 14.

Figure 2C:
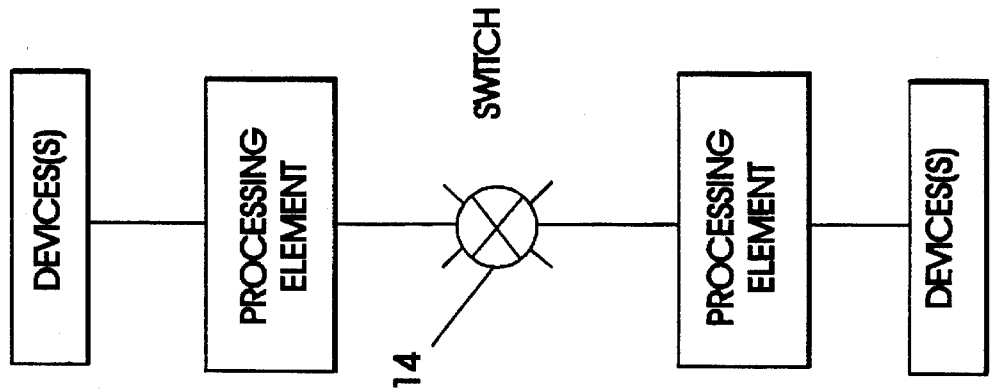
FIGS. 2A–2C show various implementations of interconnect media connecting the processing elements of the system of FIG. 1.
Figure 2B:
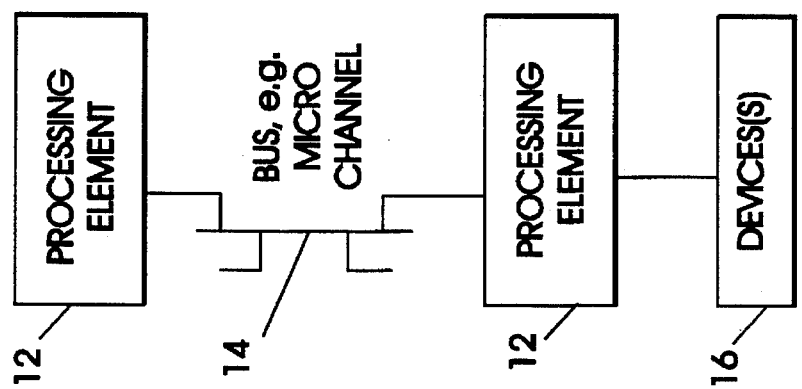
Figure 2A:
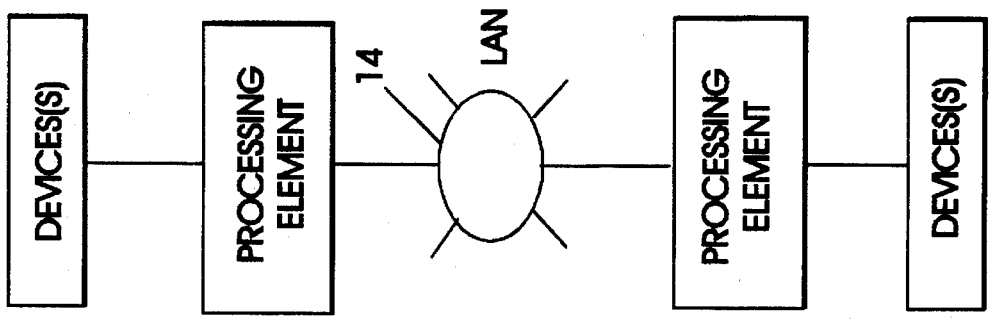

Various types of interconnect media 14 are contemplated by the present invention. As shown in FIGS. 2A–2C, contemplated types of interconnect media include local area networks (LANs), bidirectional computer buses such as the IBM Microchannel® bus, or a high speed digital switching network. High speed digital switching networks such as that shown in FIG. 2C are usually constructed using coaxial or fiber optic cables. Other types of interconnect media 14 contemplated by the present invention include, for example, data-cube type networks or point-to-point mesh networks. Accordingly, the processing elements in the system may be connected serially or via bus architecture. If a bus architecture such as Microchannel® is used (FIG. 2B), a simulated link is provided to simulate a serial interconnection between the processing elements 12.

Figure 3:
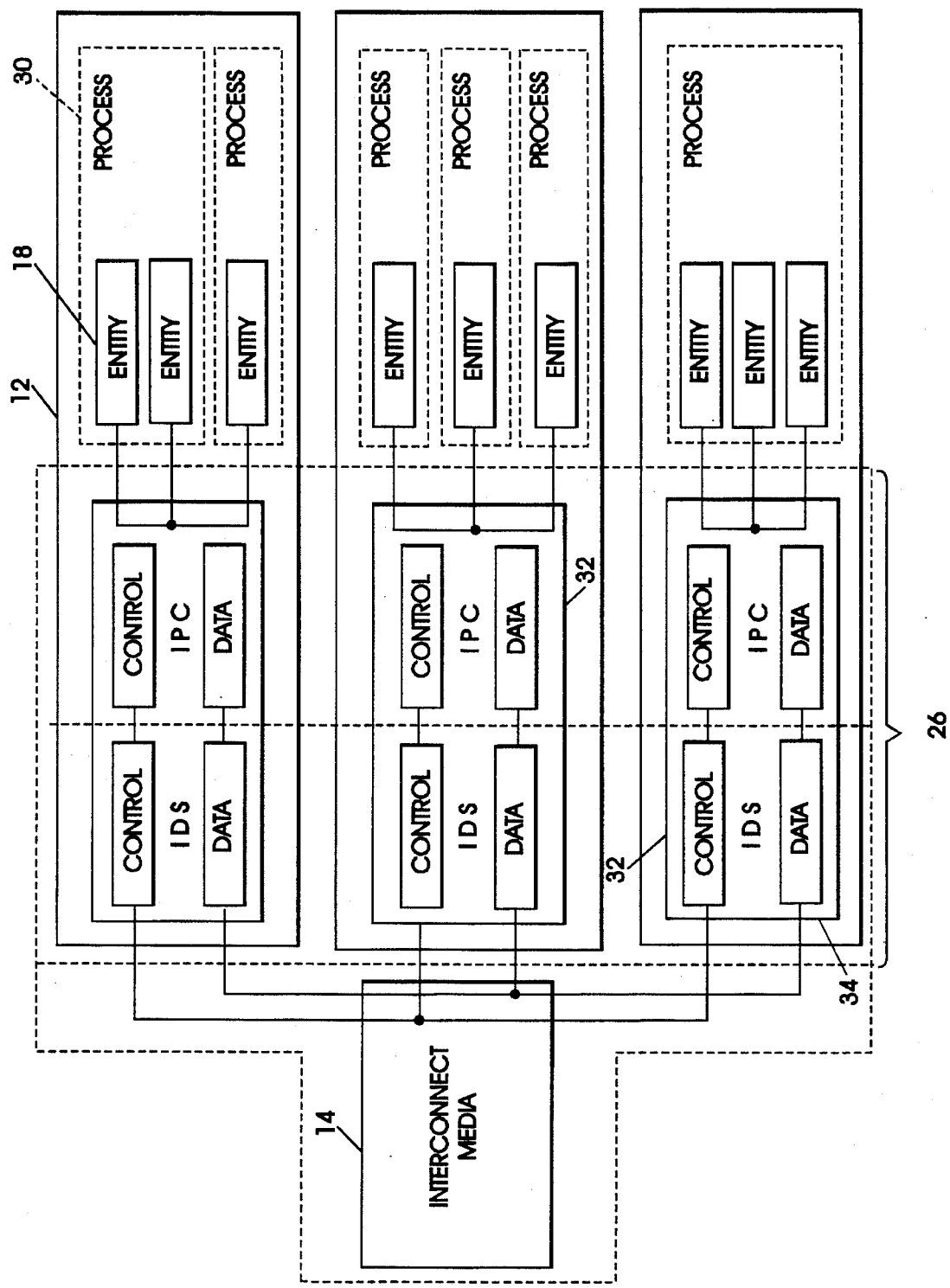
FIG. 3 is a detailed schematic of the architecture of the processing elements of the system of FIG. 1.

In general, functions or active entities 18 may be distributed or mapped among the processing elements 12 in the system in various configurations, as shown in FIG. 3. For example, there may be one or more active entities 18 in any one process 30 and one or more processes in any one processing element 12. Each of the active entities 18 are implemented as programs and are adapted to perform one or more functions which define all or part of a particular process 30. The entities may be structured in layers, e.g., on a local layer within a processing element 12 and on a system layer within the system 10.

The entities 18 are executed within the processes 30, or process threads, by means of receipt of control messages. Each entity operates on a separate process thread, which is the smallest unit of operation to be performed in parallel with other threads in a process 30. Conceptually, a thread is a path of execution through a program, as a body of code that performs a specific function. The difference between a thread and a process is that many threads can execute concurrently within a single process. The use of multiple process threads instead of separate processes results in less overhead (the time, operations, and resources used for operating system functions), leaving more resources for application programs. In addition, multiple threads give programs the ability to perform several chores in parallel, for example, to use many disparate I/O devices simultaneously, without degrading the user's view of system performance.

The interconnect support 26 connecting the active entities 18 with the interconnect media 14 (see FIG. 1) is implemented in a combination of hardware and software and provides the mechanism by which (i) active entities within the same processing element communicate with each other and (ii) active entities within one processing element communicate with entities in another processing element. The software mechanism through which functions or active entities 18 communicate with each other on a local level within the same processing element 12 is implemented in the interconnect support 26 and is referred to as interprocess communications (IPC) 32. IPC 32 is the mechanism used to pass information in the form of data and control messages, such as read and write operations, between the various processes or threads in a particular processing element 12. Control messages and data are managed separately by the mechanism provided by the present invention. Although both data and control message transfer are mentioned herein, the invention relates specifically to a mechanism for distributing control messages between interconnected processing elements.

The hardware mechanism by which active entities on different processing elements 12 communicate with each other is also incorporated into the interconnect support 26 and is referred to as inter-delivery support (IDS) 34. IDS distributes control messages and data among various processing elements in a manner which permits communication between entities on separate processing elements. IDS 34, then, serves as a processing element-to-processing element layer of communication within the system and IPC 32 functions as an entity-to-entity layer of communication within the same processing element. The interconnect support 26 includes both IPC 32 and IDS 34.

Like IPC 32, IDS 34 is responsible for control message transfer and data delivery between entities, except that the control messages and data pass via the interconnect media 14 from IDS 34 to an entity on another processing element in the system 10. Whereas active entities 18 communicate with each other on the same processing element over IPC 32, active entities on separate processing elements communicate with each other over IDS 34. Accordingly, IDS 34 provides a mutually agreeable communications protocol between processing elements which is used to pass information in the form of control messages and data between the various processes or threads in different processing elements.

Figure 4:
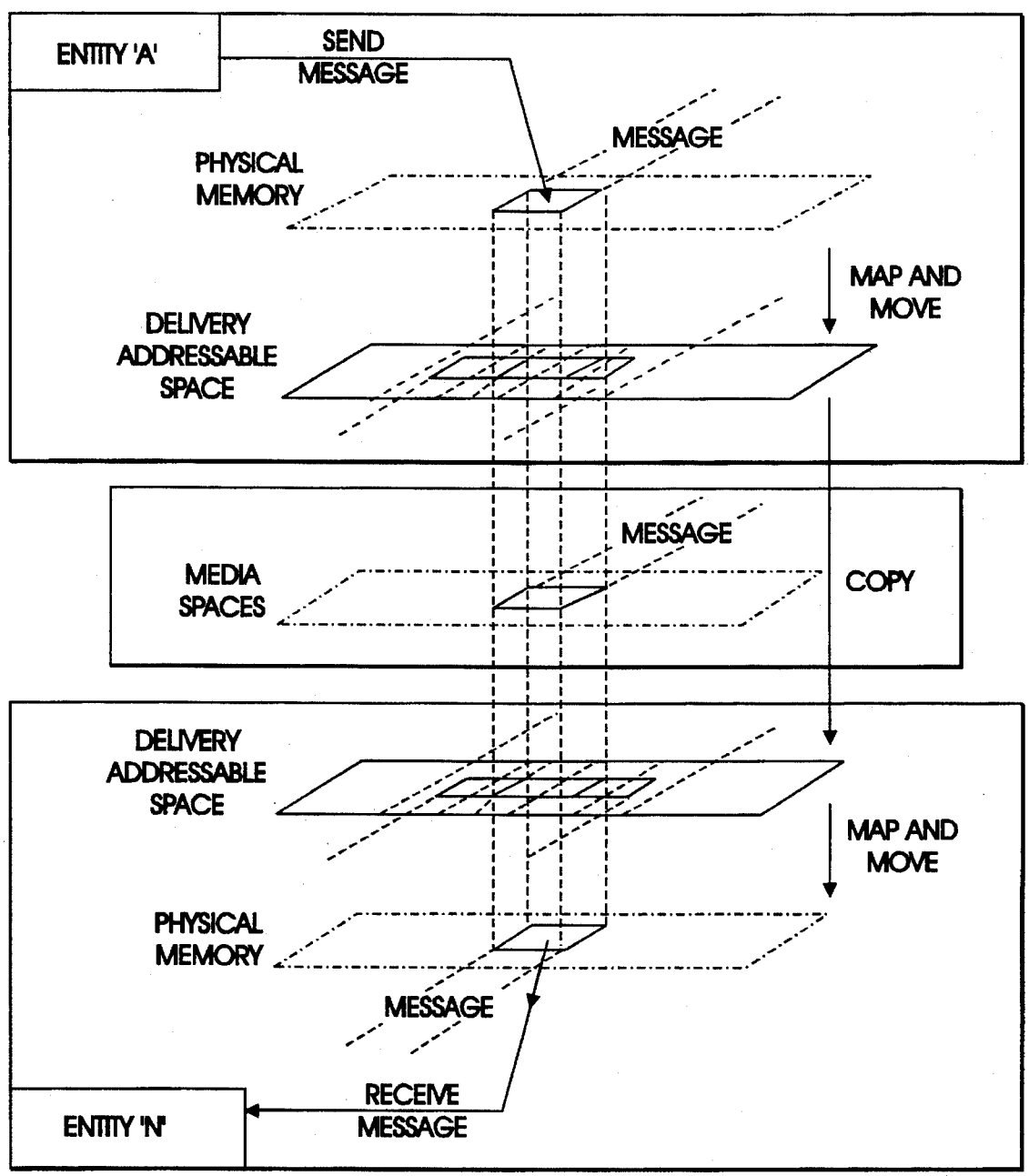
FIG. 4 illustrates the memory space structure which permits control elements to be exchanged between physical memory located on different processing elements.

As shown in FIG. 4, control messages contained in the physical memory of a first element are mapped and moved into delivery addressable space on the first processing element, mapped to media spaces in the form of link frames, copied to delivery addressable space on a second processing element, and moved to physical memory on the second processing element. The concept of mapping involves moving a message from one entity's physical memory space to another entity's physical memory space through the use of delivery addressable space which may be addressed in both entities' processing elements by IDS 34.

Figure 5:
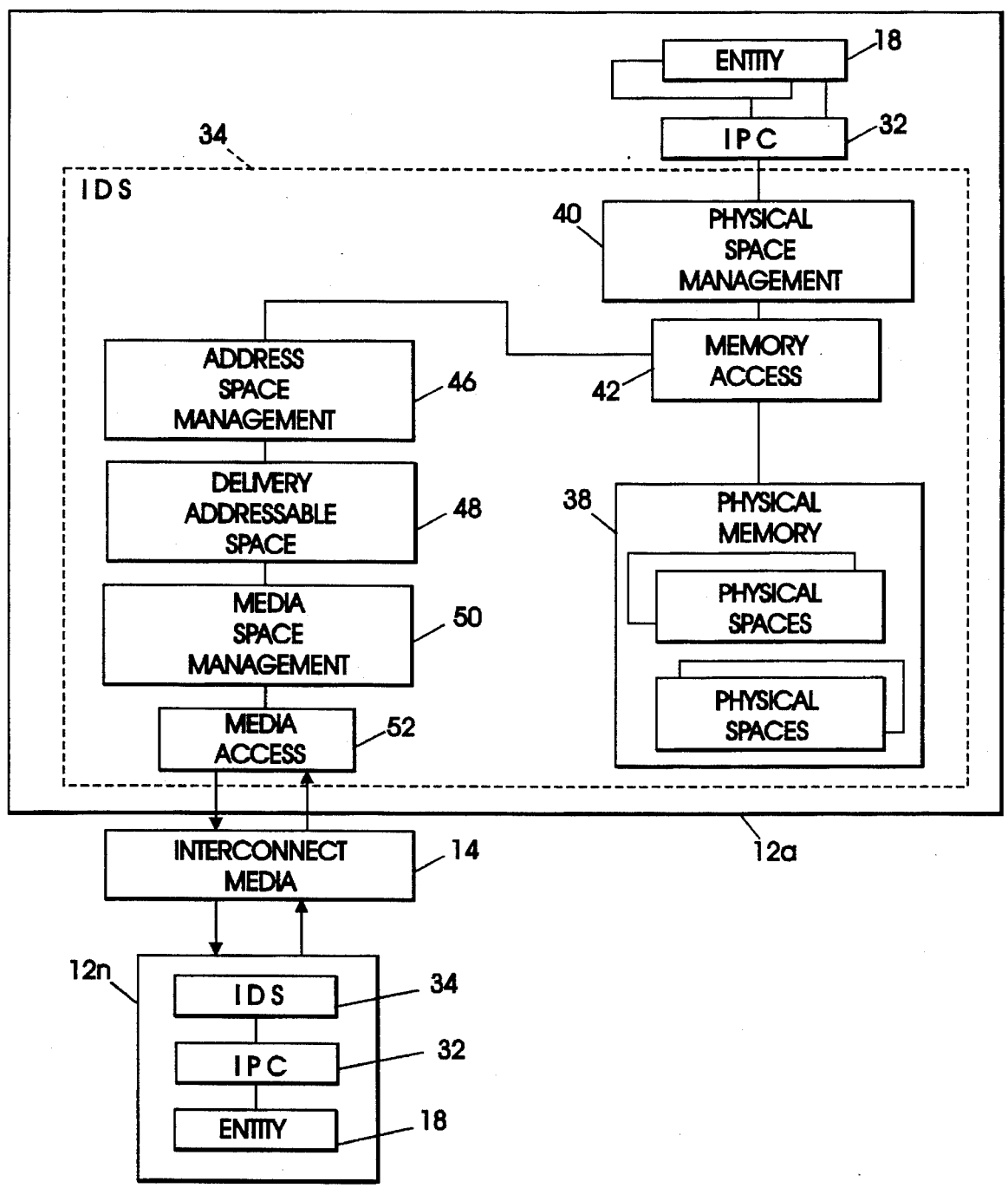
FIG. 5 is a detailed schematic of the architecture of the inter-delivery support responsible for communications between the processing elements of FIG. 3, showing non-shared memory.
Figures 6, 6A:
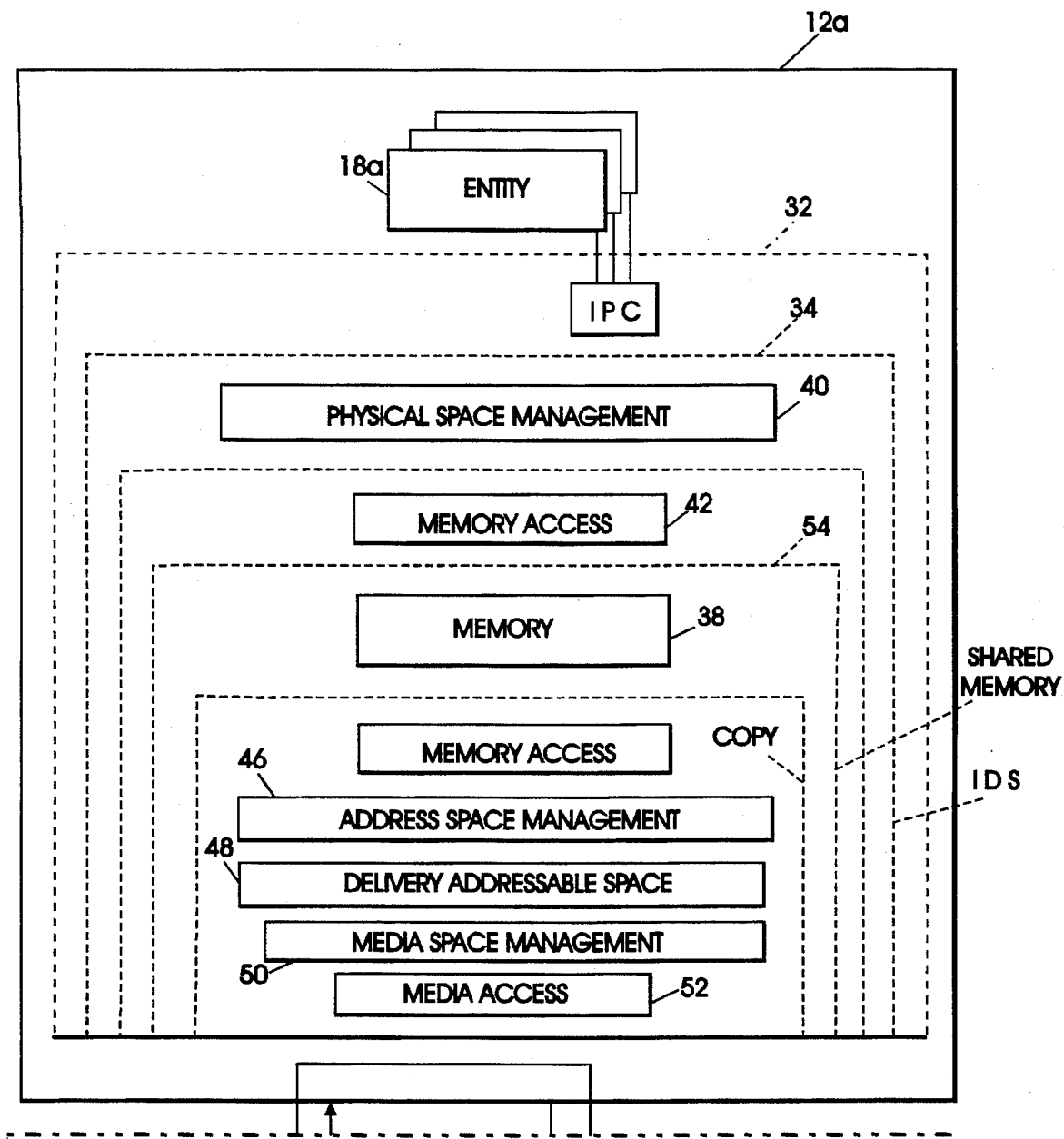
FIGS. 6A and 6B, taken together, form a detailed schematic of the architecture of the inter-delivery support responsible for communications between the processing elements of FIG. 3, showing shared memory.
Figure 6B:
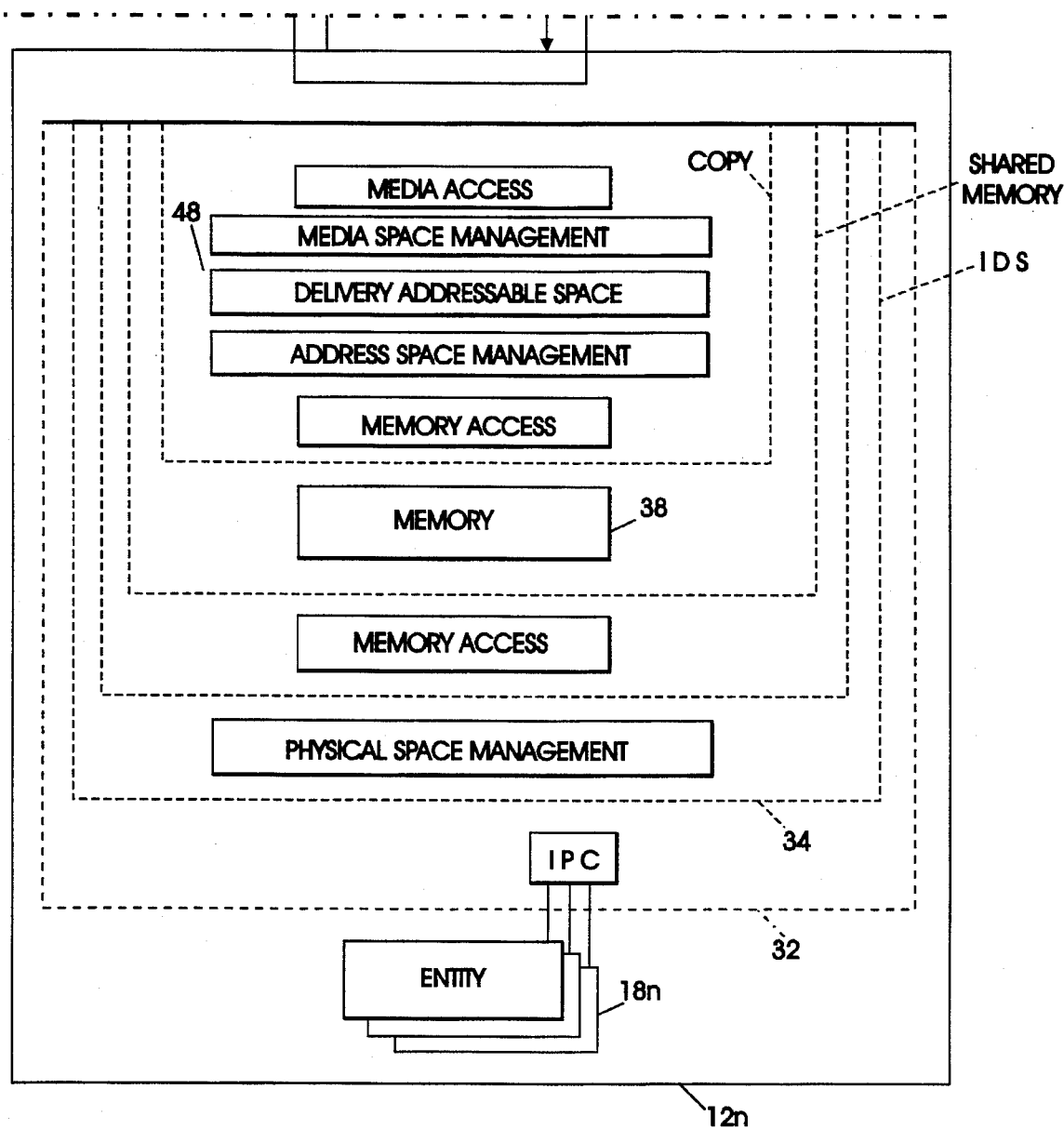

FIGS. 5 and 6A–6B illustrate the dual-layered architecture of the interconnect support 26, including IPC 32 and IDS 34, which permits entity to entity communication both between entities on different processing elements within the system and entity-to-entity communication within the same processing element. FIGS. 5 and 6A–6B also show the decomposition of functions involving delivery addressable space. Specifically, FIG. 5 shows an implementation of the invention wherein each of the processing elements 12 do not share any memory (non-shared memory), and FIGS. 6A and 6B show an implementation of the invention wherein each of the processing elements 12 share memory (shared memory).

NON-SHARED MEMORY

FIG. 5 shows an implementation of the invention in the non-shared memory case in which the processing elements may be connected via a serial form of interconnect and are not allowed direct access of memory in other processing elements, such as the LAN shown in FIG. 2A or the serial switch of FIG. 2C (certain bus interconnected systems, as in FIG. 2B, may not support shared memory access between processing elements as well).

On the first level of architecture, an entity 18 on a particular processing element 12 may access via IPC 32 control messages located in a storage device (physical memory) 38 which resides on that processing element. On the second level of architecture, IDS 34 on a particular processing element 12 is used to deliver control messages from the physical memory 38 on that processing element to the interconnect media 14. From the interconnect media 14, the control messages may be passed to an entity on a second processing element via IDS 34 on the second processing element.

An entity 18 accesses control messages located in physical memory 38 in the same processing element in which it resides through IPC 32, space management hardware/software 40 and memory access hardware/software 42. Other entities 18 on the same processing element 12 may access the physical memory 38 via the same path. The various entities on a particular processing element may share control messages obtained from the physical memory 38 with one another by means of IPC 32.

An entity 18 on a first processing element accesses control messages located in the physical memory 38 of a second processing element via IDS 34 and the interconnect media 14, in the following manner (refer to FIG. 5). Address space management 46 on the first processing element interfaces with memory access hardware/software 42 to obtain control messages from the physical memory 38. The control messages are moved into delivery addressable space 48 which may be accessed over the interconnect media 14 by IDS 32 on the second processing element. Memory access hardware/software 42 masks the physical location of control messages contained in the physical memory 38 from the corresponding delivery addressable space 48. The masking of physical details is provided for various reasons, among which is independence of processing element architecture and security concerns. The control messages are transferred from the delivery addressable space 48 to the interconnect media 14 by media space management 50 which accesses the interconnect media via media access hardware 52. The media access hardware 52 includes a buffer wherein control messages may be stored prior to being sent over the interconnect media 14.

IDS 34 on the second processing element may receive the control messages by accessing the interconnect media 14. The receiving IDS then reverses the process whereby the control message was obtained from physical memory 38 on the first processing element. Specifically, the IDS 34 on the second processing element copies the control message from the delivery addressable space 48 in the first processing element to delivery addressable space of its own. The control message is then moved to the physical memory in the second processing element, where it may be accessed by one or more of the entities operating in the second processing element.

Accordingly, entities on a second processing element may access and obtain control messages residing in the physical memory of a first processing element by a process through which (i) IDS on the first processing element moves the control message from physical memory therein to address space provided by the IDS on the first processing element, (ii) the control message is copied from the address space on the first processing element to address space on the second processing element, and (iii) IDS on the second processing element moves the control message from the address space on the second processing element to the physical memory on the second processing element.

Thus, IDS 34 operates asynchronously with respect to the entities 18 on various processing elements. As used herein, "synchronous" relates to operation of the IDS on the same processing thread as that of an entity on the same processing element, and "asynchronous" pertains to IDS operating on a different thread than the entity requesting delivery over the IDS. Each of the active entities or functions on the separate processing elements are executed independently and asynchronously with respect to each other.

The present invention relates to the hardware support in the IDS 34 which is use to pass control messages between the various processes or threads operating in separate processing elements in the system. The control messages are formed by control elements and may be of variable length. The control messages typically represent a request or a reply, and may include control parameters or data within the messages or may point to some data area to be transferred between entities.

SHARED MEMORY

FIGS. 6A and 6B show an implementation of the invention in the shared memory case in which the processing elements are typically connected via a bus form of interconnect and are allowed direct access of memory in other processing elements, such as the Microchannel® shown in FIG. 2B. Shared memory 54 refers to (i) the physical memory storage spaces in the physical memory 38 in each of the processing elements 12, (ii) the memory access hardware/software 42 in each of the processing elements, (iii) the delivery addressable space 48 in each of the processing elements, and (iv) the media access hardware 52 in each of the processing elements. The physical memory storage spaces define the actual memory locations in which control messages physically reside. The delivery addressable space includes control addresses into which control messages are moved from the physical memory storage spaces prior to being copied over the interconnect media 14 to delivery addressable space 48 on another processing element.

To the entities exchanging control elements between each other, the shared memory appears to be physical memory and delivery addressable space located on that processing element. To the IDS, the shared memory appears to be the delivery addressable spaces which are shared between IDS on different processing elements. By utilizing the shared memory 54, IDS 34 permits entities on different processing elements to communicate with each other by sharing access to physical memory spaces located on the separate processing elements. The delivery addressable space, which provides addresses for the control messages which are accessible by the entity in which it resides, coupled with the copy functions provided by the different entities, permit control messages to be copied between processing elements over the interconnect media without disrupting activity between entities and physical memory on the same processing element.

The shared memory 54 does not include any physical memory spaces which are commonly addressable by entities on various processing elements. The only space which is addressable by the various processing elements is the delivery addressable space on each processing element. This addressable space maps to one or more real addresses in the physical memory 38.

PIPE ARCHITECTURE AND ENQUEUE AND DEQUEUE LOGIC

Figure 7B:
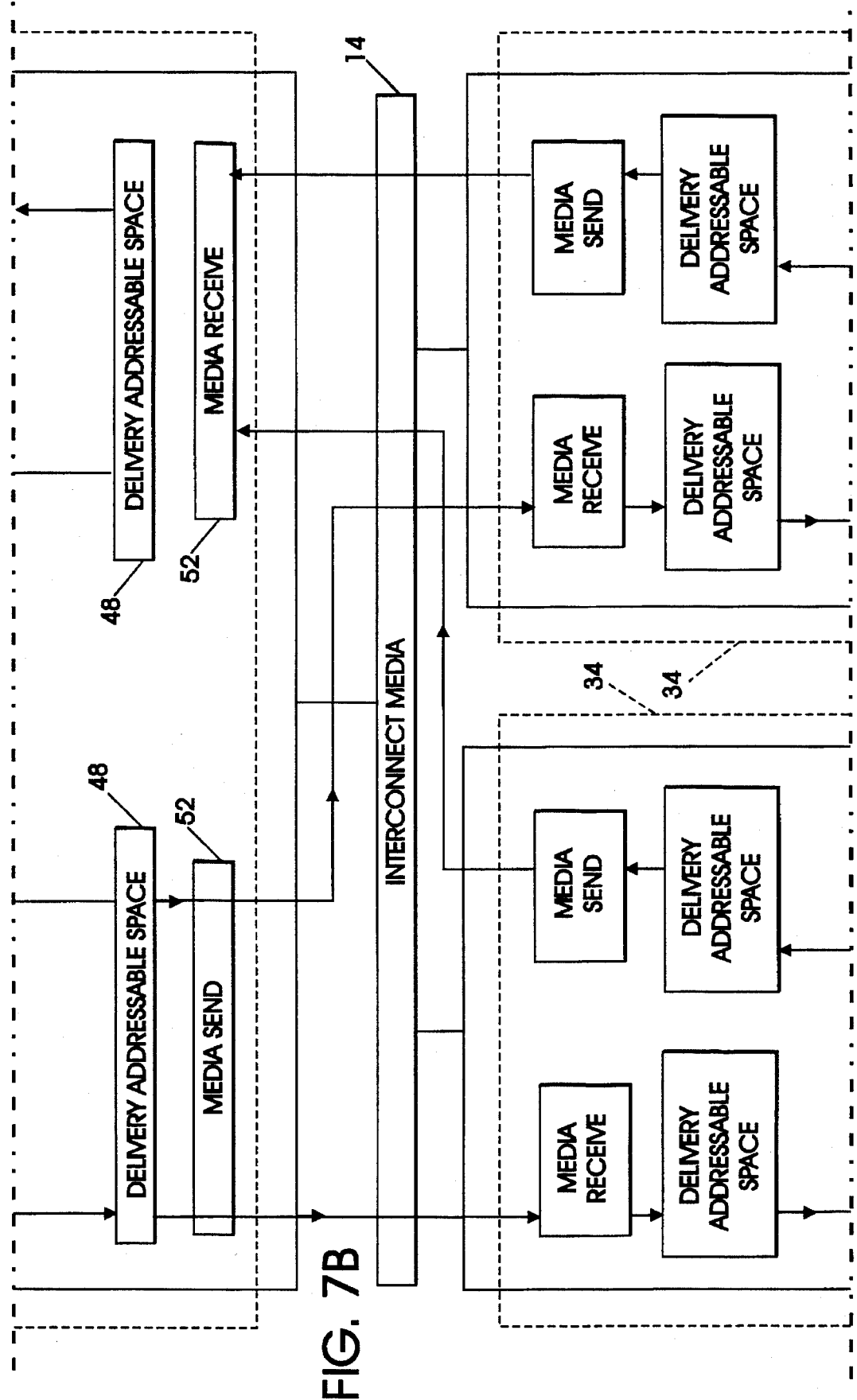
Figure 7C:
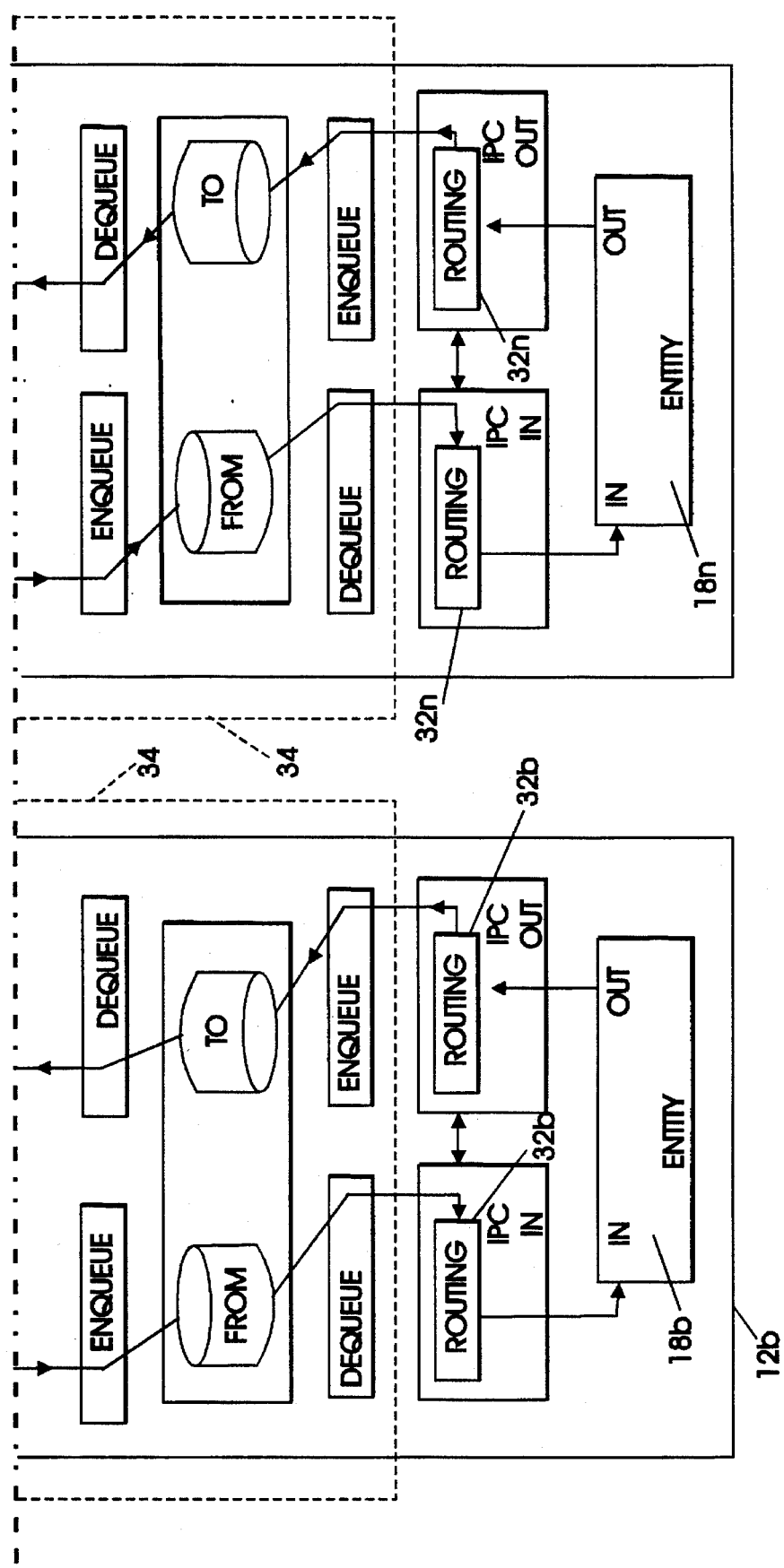

The routing paths by which control messages are delivered by IDS 34 between entities on separate processing elements are shown in more detail in FIGS. 7A through 7C. Delivery of control messages to and from IDS 34 on separate processing elements occurs by queuing the control messages through first-in-first-out (FIFO) buffers, or pipes 56. The IDS hardware associated with each processing element provides a pair of delivery pipes 56 for each of the other processing elements in the system. The first delivery pipe of the pair is used for buffering outgoing control messages and the second pipe is used for buffering incoming control messages. Enqueuing the control message in the pipes provides a buffer wherein the source entity in the sending processing element may continue to execute operations while the control message is waiting to be sent to the destination processing element.

For simplicity, in FIGS. 7A through 7C, processing element 12a is shown with only two functional entities and is provided with two pairs of pipes. Processing elements 12b and 12n are shown with only one functional entity and, one pair of pipes each. It is to be understood, however, that the invention may be implemented in a computer system having more than three processing elements, each of which processing elements may have several functional entities.

Control messages are routed in and out of entities by means of routing queues or mechanisms 58, which permit incoming and outgoing messages to be queued while the sending and receiving entities continues processing. The placing of control elements onto a delivery pipe 56 or an IPC routing queue 58 is referred to as an enqueue operation, and the removal of control elements from a delivery pipe or IPC routing queue is referred to as a dequeue operation.

As shown in FIGS. 7A through 7C, the IPC routing queues 58 for a particular processing element are divided into a first set of routing queues for outgoing control messages and a second set of routing queues for incoming control messages. For an outgoing control message, the IPC software first determines if the destination entity for the control message is located on the same processing element or a different processing element. If the destination entity is located on the same processing element, the control message is routed from the first set of outgoing routing queues to the second set of incoming routing queues, and sent directly to the destination entity on that same processing element.

If the outgoing control message is destined for an entity on another processing element, the IPC software builds the control message from control elements and enqueues the elements onto the appropriate delivery pipe 56. The outgoing IPC routing queues thereby serve as work queues that demultiplex control elements received from a particular entity on a processing element and place them in the appropriate pipes 56 in the IDS hardware 34. The outgoing message is enqueued by enqueue logic 60 into a delivery pipe 56, temporarily stored in the delivery pipe, and dequeued by dequeue logic 62. The dequeued message is then mapped into delivery addressable space 48 on the same processing element.

All operations for the IPC software are directed to local memory and thus the IPC software operations are not affected after an outgoing control message is copied into delivery addressable space 48. The IPC software need not wait for the interconnect media 14 to be accessed by the media access hardware (media send) 52 before returning to normal operations because the control messages may be copied between delivery addressable space 48 on different processing elements by IDS via the interconnect media independently and asynchronously of IPC operation. Moreover, because the protocol of IDS on the sender processing element operates asynchronously with respect to the entity sending the control message, the IDS may scan the delivery pipes 56 continuously for enqueued messages. This asynchronous operation permits inter-entity communication between processing elements without degrading the processing performance of the entities on those processing elements.

Upon detecting that a control message is waiting in an outgoing delivery pipe 56, the IDS for the sending processing element determines if the interconnect media 14 is available. Because the interconnect media 14 may either be shared between all of the processing elements in the system, or may be dedicated to a particular destination processing element by another processing element, it may not be available when the IDS first detects a control message waiting in a pipe. Due to this shared nature of the interconnect media, it is efficient to schedule the use of the interconnect media to permit transfer of more than one queued message destined for a particular processing element at the same time.

Once it is determined that the interconnect media 14 is available and that the required number of control messages have been enqueued, an interconnect session is established, permitting the enqueued control messages to be passed via the interconnect media to the receiver processing element.

At the destination processing element the media access (receive) 52 removes control messages from the interconnect media and copies them to its delivery addressable space. Because the operation of the IDS delivery pipes 56 is the same in each direction, the control message is enqueued by enqueue logic 60, temporarily stored in the delivery pipe 56, and dequeued by dequeue logic 62 to the appropriate incoming IPC routing queue 58. On the destination processing element, there is a support thread to dequeue control elements and enqueue them onto the appropriate IPC incoming routing queue.

The incoming routing queues in IPC on the receiver processing element demultiplex the control messages and direct them to the appropriate local process thread on the receiving processing element. This demultiplexing support operates on a separate thread and may be performed when convenient for optimum processor operation, instead of requiring a processor interrupt, thereby reducing overhead. The software execution for demultiplexing is done using only local memory access. The receiving entity 18 then confirms receipt of the control message by passing an acknowledge message back to the sending entity. Accordingly, the IDS 34 operates asynchronously with respect to the entities on both the sending and receiving processing elements.

Figure 8:
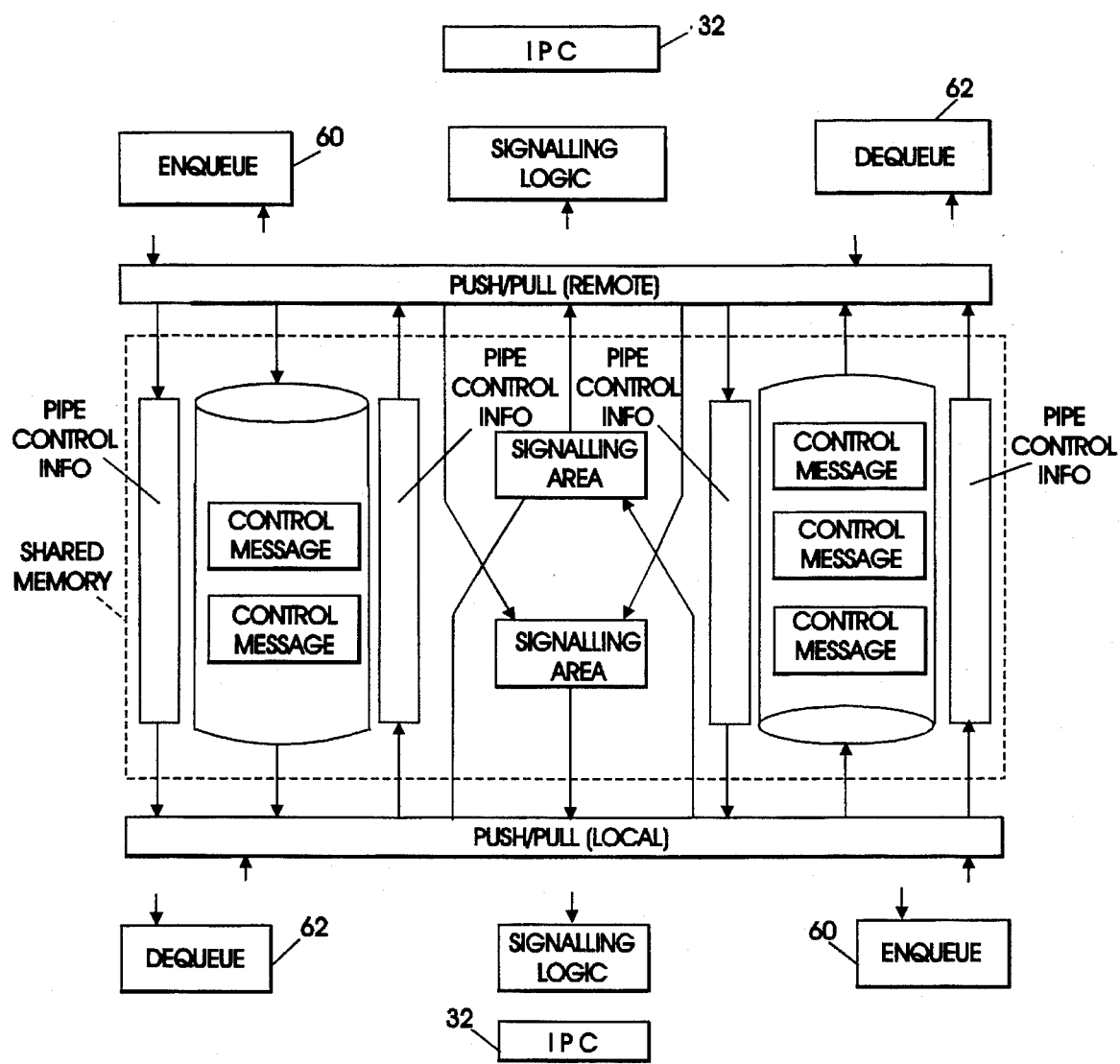
FIG. 8 shows the delivery pipe architecture as implemented in a system with direct access to shared memory between processing elements.
Figure 9A:
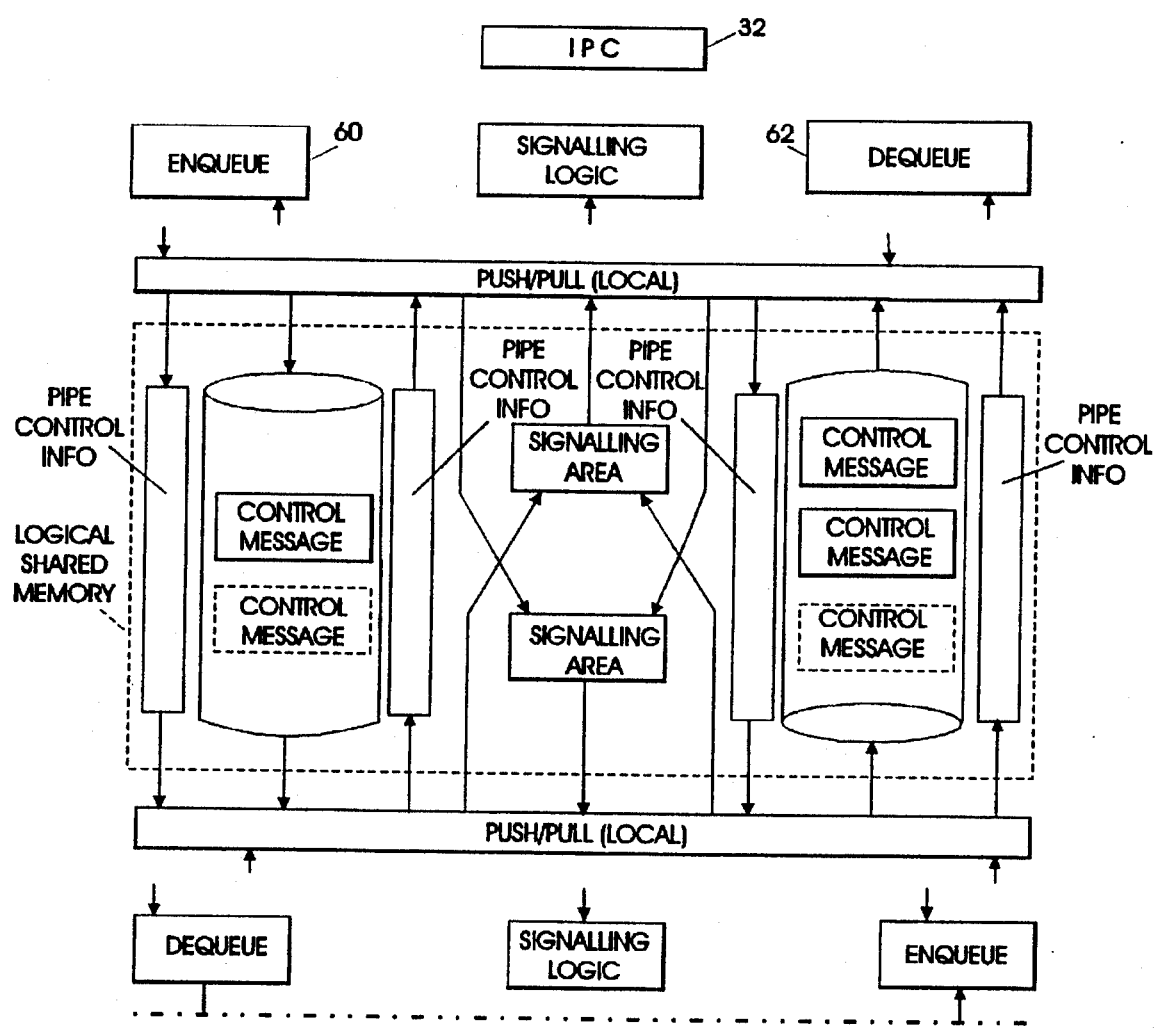
FIG. 9A and 9B, taken together, show the delivery pipe architecture as implemented in a system without direct access to shared memory between processing elements (non-shared memory)
Figure 9B:
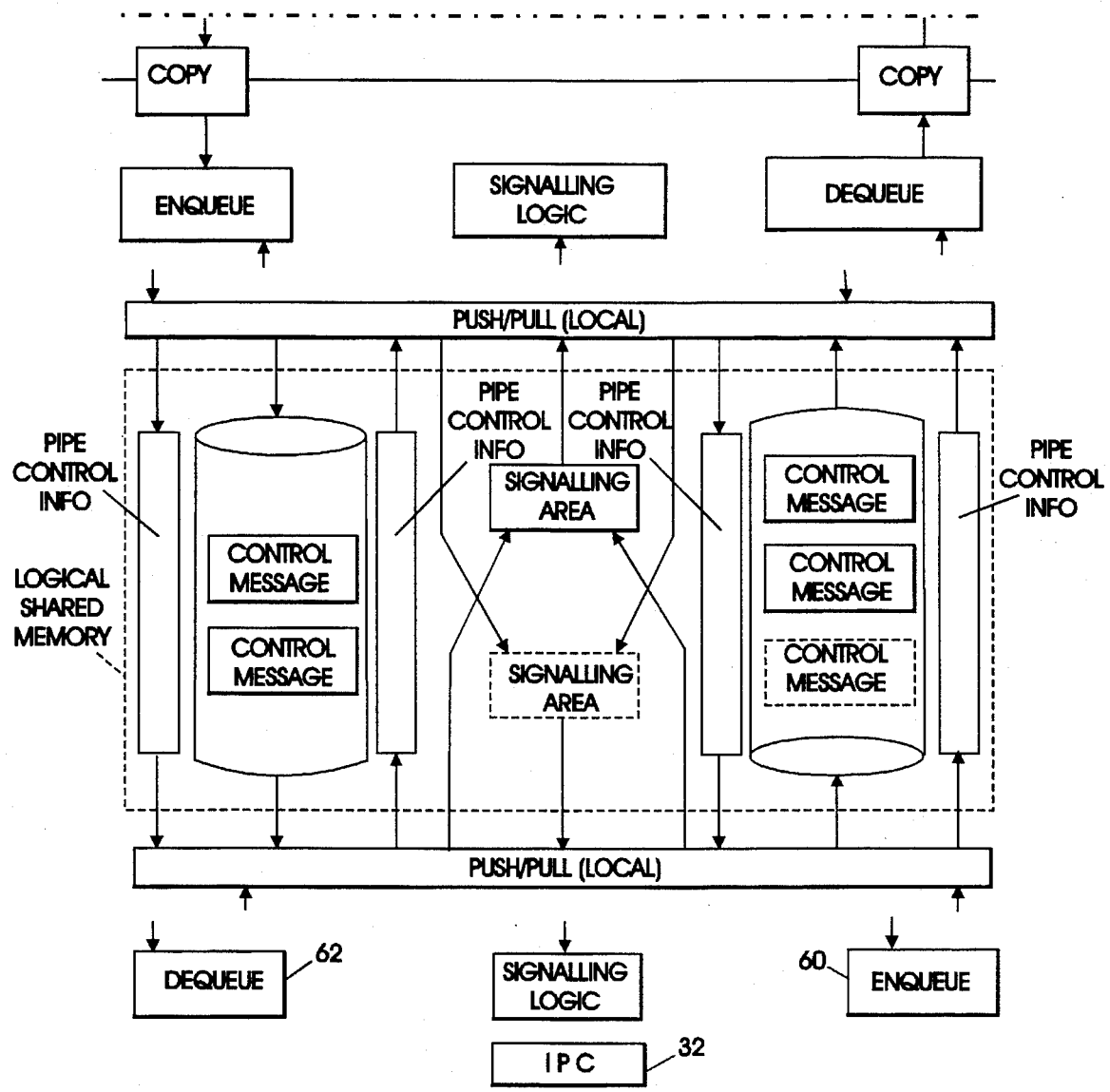
Figure 10:
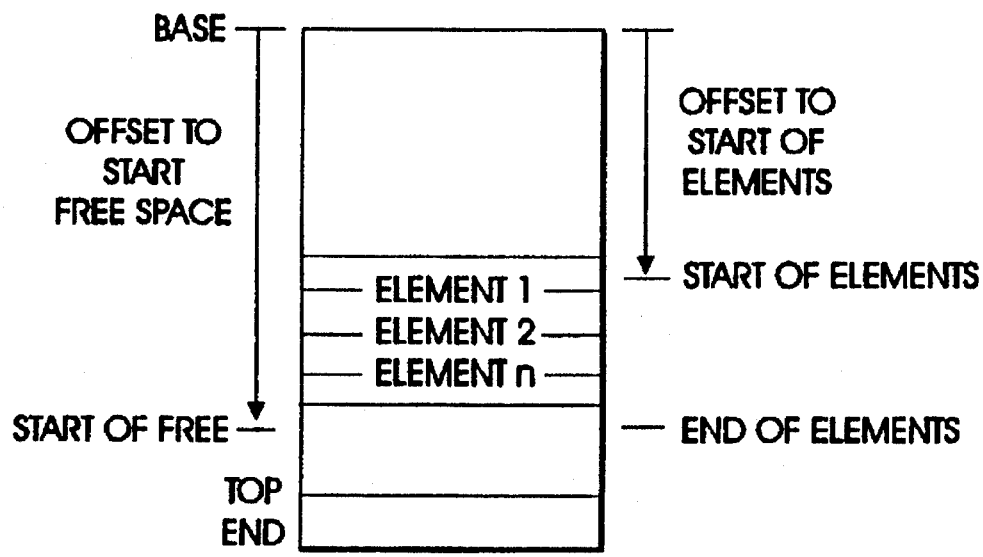
FIG. 10 illustrates the architecture of a delivery pipe used in the inter-delivery support of FIGS. 5 and 6A–6B.

The relationship of the delivery pipes for the shared and non-shared memory system implementations is shown in FIGS. 8 and 9A–9B, respectively. In typical bus interconnected systems which allow direct shared memory access between processing elements (FIG. 8), the logical and physical pipe and signalling control area is implemented within a shared memory area. For non-shared memory systems which include using serial communications interconnect forms, a logical pipe consists of a physical pipe in both the source and destination processing elements (FIGS. 9A and 9B). The logical signalling control area also consists of physical signalling control areas implemented in both the source and destination processing elements. The inter-delivery support provides this appearance of a "logical shared memory" area contained in the local physical memory of each source and destination processing element. The architecture of a delivery pipe 56 and the associated enqueue and dequeue logic is better shown in FIGS. 10 through 12. The term "logical shared memory" is used throughout the following descriptions to indicate implementation of this invention in systems which include shared memory or non-shared memory access.

The delivery pipe 56 is a control area maintained in logical shared memory. The pipe storage space is managed as a FIFO buffer in which entities in one processing element insert control elements at one end and entities in another processing element remove the process elements from the other end of the pipe. As shown in FIGS. 7A through 7C, each pipe represents a circular queue and contains an area in which the control elements are enqueued, held and subsequently dequeued.

The enqueue logic 60 places one or more variable length control messages into the delivery pipe 56 in logical shared memory, and provides access to the control areas associated with the destination processing element. The specifics for calling the enqueue function are internal to the system and are not defined by the system architecture. However, the following parameters are required when calling the enqueue function: ENQUEUE (address, count, urgency, return code). The address parameter indicates the location in the address space of the caller of the control element to be placed in the delivery pipe 56. The count parameter indicates the number of control elements to be enqueued. If more than one control element is specified, all of the control elements must be contiguous in the memory space identified by the address parameter. The urgency parameter indicates the relative priority of the request to enqueue the control element (normal or expedited). The return code parameter is returned to the caller and indicates the success or failure of the enqueue operation.

The dequeue portion of the IDS 34 provides the function of removing the control elements from the delivery pipe(s) 56. The control elements are enqueued by the IPC routing queue 58 using the control areas as specified by the delivery pipe(s) 56 space definition. The dequeue function of the IDS 34 polls the status of all of the delivery pipes 56 at regular intervals to determine their status. The IDS 34 hardware then removes the control element from the pipe and updates the pipe's control area to reflect the change in the delivery pipe(s) 56 space area. The IDS hardware then delivers the control element to the processing element for which the control element is destined. The IDS hardware can dequeue multiple control elements from one delivery pipe before servicing another control element delivery pipe.

Because each entity in a processing element may be operating on a separate thread, access to the various pipes on the sending processing element must be managed so that the enqueue operation to a pipe is not mixed with that from another thread to the same pipe. The enqueue and dequeue functions used to access the pipe space shared between support in different processing elements is defined so that locking between processing elements is not required.

Figure 11:
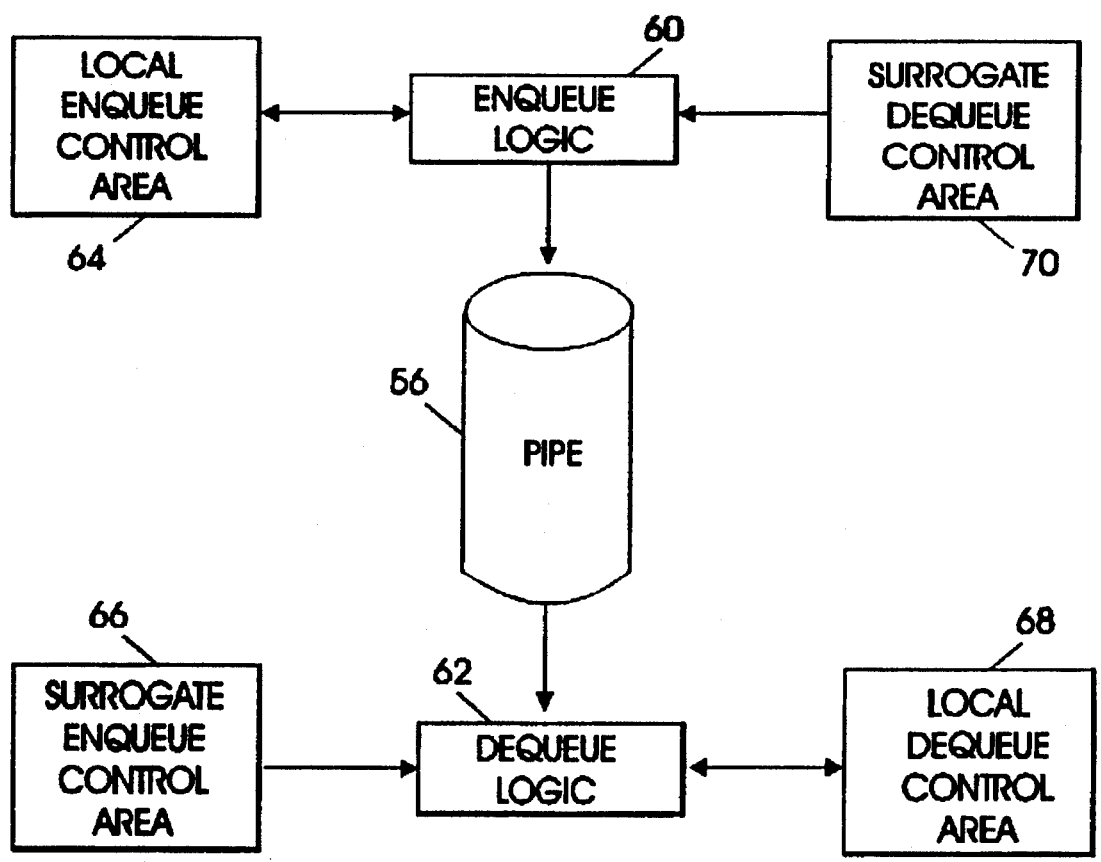
FIGS. 11 and 12 are schematics of the enqueue and dequeue areas associated with the delivery pipe of FIG. 10.

The operation of the pipe is controlled by a local enqueue control area 64, a surrogate enqueue control area 66, a local dequeue control area 68, and a surrogate dequeue control area 70 (FIG. 11). The surrogate enqueue control area 66 functions to write only to the enqueue logic 60 and read only to the dequeue logic 62, while the surrogate dequeue area 70 functions to read only to the enqueue logic and write only to the dequeue logic. The local enqueue and local dequeue areas are in memory which is local to each processing element, and the surrogate enqueue and dequeue areas are located in logical shared memory.

Each delivery pipe 56 has a set of pointers in the local enqueue control area 64 and in the local dequeue control area. The pointers in the local enqueue control area 64 indicate the start of free space and the end of free space in the delivery pipe, and the pointers in the local dequeue control area 68 indicate the start of elements and the end of elements (see FIG. 10). Both of these control areas have pointers which indicate the TOP of the delivery pipe (the threshold point for normal enqueue operations); the BASE of the delivery pipe (the beginning of the usable space in the pipe); and the END of the delivery pipe (the end of usable space in the pipe). Control elements may be wrapped around a circular pipe 56 if a control element does not fit into the space remaining between the current end of elements and the TOP of the pipe.

Figure 12:
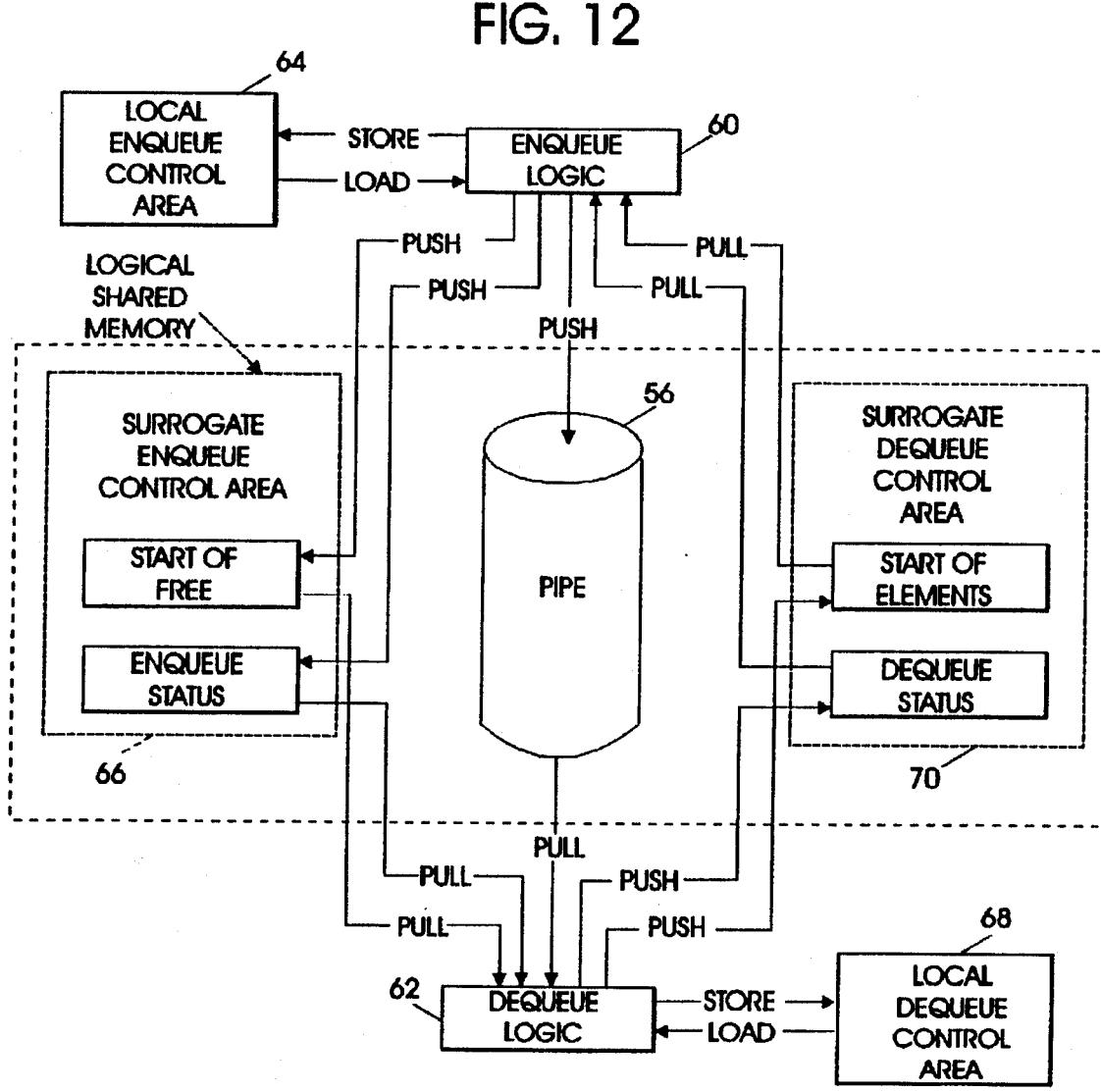

Access to the delivery pipes 56 pipes is done via a set of primitives, or interactions, between two adjacent entities. In a shared memory system, these primitives mask whether the real memory in which the pipes reside is local to the processor or is located in some other processor. These primitives are called push and pull operations. As shown in FIG. 12, push and pull operations dictate the flow of control messages through the delivery pipe 56 and between enqueue logic 60 and dequeue logic 62. Control messages are "pushed" out of the enqueue logic 60 to the delivery pipe 56 and "pulled" from the delivery pipe by the dequeue logic 62. Control messages are also "pushed" out of the dequeue logic 62 to the surrogate dequeue control area 70 and pulled from the surrogate dequeue control area by the enqueue logic 60.

LOCAL ENQUEUE CONTROL AREA

Within a given processing element, there is one local enqueue control area 64 for each delivery pipe 56. Each control area is identical in structure, and is constructed and maintained in either local or logical shared memory. Fields within each control area identify the location of the delivery pipe 56 with which it is associated, indicate the current status of the pipe (empty, full, or wrap), and provide state information identifying the starting and ending offsets of control elements in the pipe (see FIG. 10).

FIG. 13 shows the structure and format of the local enqueue control area 64, and its fields of information. The pipe address field (BASE) is a 32-bit doubleword-aligned field containing the 32-bit physical address of the area in logical shared memory where the circular queue of control elements is maintained. The enqueue status field (ES) is a 16-bit, word-aligned field containing bits used to maintain current status information of the pipe 56 as perceived by the local enqueue logic 60. Bit 0 is the full bit and indicates if the pipe is full. The enqueue logic 60 sets this bit to "1" (full) when it attempts to place a control element into the pipe and there is insufficient space. The enqueue logic 60 resets this bit each time it successfully places a control element into the pipe. This bit is also reset to "0" (not full) during initialization or after both ends of the delivery pipe 56 are synchronized. Bit 1 is the empty bit and is set to reflect the setting of the empty bit in a surrogate dequeue status field in the surrogate dequeue control area 70. Bits 2–7, 9–10 and 12–15 are reserved. Bit 8 is the wrap bit and indicates when a control element will not fit into the space in the pipe remaining between the start of free space and the TOP of the pipe. The enqueue logic 60 toggles the current setting of this bit, which is initially set to "0" during initialization or after both ends of the delivery pipe 56 are synchronized. Bit 11 is the queued bit and indicates that a control element has been successfully placed into the pipe by the enqueue logic 60.

The wrap element offset field (WE) is a 16-bit, word-aligned field containing the offset, in bytes, from the pipe address (BASE) to the location of the wrap control element in the pipe. This field is updated each time a wrap control element is placed into the pipe.

The end of free space field (EF) is a 16-bit, word-aligned field containing the offset, in bytes, to the end of free space in the pipe. This field represents the end of the available space for placing control elements into the pipe. This field is updated each time the enqueue logic 60 is called. The field is checked against the start of elements field in the surrogate dequeue control area 70 to insure that control elements that have not been dequeued are not overwritten.

The start of free space field (SF) is a 16-bit, word-aligned field containing the offset, in bytes, to the start of free space in the pipe. The start of free space corresponds to the location for the next control element that is to be placed into the pipe. This field is updated each time a control element is placed into the pipe.

The offset to TOP field (TOP) is a 16-bit, word-aligned field containing the offset, in bytes, to the end of the usable area of the pipe which can be used for holding control elements. The status of this field is set at initialization.

The offset to END field (END) is a 16-bit, word-aligned field containing the offset, in bytes, to the physical end of the pipe. This field represents the physical size of the pipe when allocating space in logical shared memory for the pipe. The offset to TOP and offset to END fields ensure that sufficient space is reserved at the end of the pipe to hold a wrap control element.

SURROGATE ENQUEUE CONTROL AREA

The surrogate enqueue control areas 66 are constructed and maintained in logical shared memory 54. The two fields which exist in this control area are the surrogate start of free field (SSF) and the surrogate enqueue status field (SES). The information in these fields is referred to as surrogate information because it is a copy of the information found in the local enqueue control area 64. The surrogate information contained in the surrogate enqueue control area is used by the dequeue logic 62 at the other end of the pipe, along with information in the local enqueue control area 64, to manage the distributed aspects of the pipe.

The surrogate start of free field (SSF) is a 16-bit, word-aligned field containing the offset, in bytes, from the pipe address (BASE) to the location in the pipe where the enqueue logic places the next control element. The surrogate start of free field is updated by the enqueue logic 60 after each control element is placed into the pipe. The enqueue logic 60 writes to the field and the dequeue logic reads from the field.

The surrogate enqueue status field (SES) is a 16-bit, word-aligned field containing bits used to inform the dequeue logic 62 of the current state of the pipe, as perceived by the enqueue logic 60. The enqueue logic writes to the field and the dequeue logic reads from the field. The enqueue logic 60 updates all of the bits in the surrogate enqueue status field each time a control element is placed into the pipe. The surrogate start of free field (SSF) must be written prior to the surrogate enqueue status field (SES) to preserve the integrity of accesses to the pipe.

LOCAL DEQUEUE CONTROL AREA

Like the local enqueue control areas 64, within a given processing element, there is one local dequeue control area 68 for each delivery pipe 56. Each control area is identical in structure, and is constructed and maintained in either local or logical shared memory. Fields within each control area identify the location of the delivery pipe 56 with which it is associated, indicate the current status of the pipe (empty, full, or wrap), and provide state information identifying the starting and ending offsets of control elements in the pipe (see FIG. 10).

FIG. 14 shows the structure and format of the local dequeue control area 68, and its fields of information. The pipe address field (BASE) is a 32-bit doubleword-aligned field containing the 32-bit physical address of the area in logical shared memory where the circular queue of control elements is maintained. The dequeue status field (DS) is a 16-bit, word-aligned field containing bits used to maintain current status information of the pipe 56 as perceived by the local dequeue logic 62. Bit 0 is the full bit and indicates if the pipe is full. This bit is set to reflect the setting of the bit 0 in the surrogate enqueue status field. Bit 1 is the empty bit and indicates if the pipe is empty. The dequeue logic 62 sets this bit to "1" (empty) when it determines that the pipe is empty. The dequeue logic resets this bit to "0" (not empty) when it determines that the empty bit in the surrogate enqueue status area is set to "0". This bit is also set to "1" during initialization or after both ends of the pipe are synchronized. Bits 2–7, 9 and 12–15 are reserved. Bit 8 is the wrap bit and indicates when a control element has been placed in the pipe because there was insufficient space between the top of the pipe and the start of free space for the control element. The dequeue logic 62 toggles the current setting of this bit after removing a wrap control element. This bit is initially set to "0" during initialization or after both ends of the pipe are synchronized. Bit 10 is the internal pre-empt bit which indicates that no more control elements will be removed from the pipe, even if the pipe is not empty. This bit is set and reset by the dequeue logic 62. Bit 11 is an internal dequeued bit which indicates that a control element has been successfully removed from the pipe by the dequeue logic 62. This bit is reset to "0" prior to exiting the dequeue logic.

The wrap element offset field (WE) is a 16-bit, word-aligned field containing the offset, in bytes, from the pipe address (BASE) to the location of the wrap control element in the pipe.

The end of elements (EE) is a 16-bit, word-aligned field containing the offset, in bytes, to the end of the control elements in the pipe. This field points to the byte immediately following the last control element in the pipe, and is updated each time the dequeue logic is called. This field is a copy of the information maintained as an offset in the start of free field in the surrogated enqueue control area.

The start of elements field (SE) is a 16-bit, word-aligned field containing the offset, in bytes, to the start of the next control element in the pipe. This field is updated each time a control element is removed from the pipe.

The offset to TOP field (TOP) is a 16-bit, word-aligned field containing the offset, in bytes, to the end of the usable area of the pipe which can be used for holding control elements. This field is set at initialization.

The offset to END field (END) is a 16-bit, word-aligned field containing the offset, in bytes, to the physical end of the pipe. This field represents the physical size of the pipe when allocating space in logical shared memory for the pipe. The offset to TOP and offset to END fields ensure that sufficient space is reserved at the end of the pipe to hold a wrap control element.

SURROGATE DEQUEUE CONTROL AREA

The surrogate dequeue control areas 70 are constructed and maintained in logical shared memory 54. The two fields which exist in this control area are the surrogate start of elements (SSE) and the surrogate dequeue status field (SDS). The information in these fields is referred to as surrogate information because it is a copy of the information found in the local dequeue control area 68. The surrogate information contained in the surrogate dequeue control area is used by the enqueue logic 60 at the other end of the pipe, along with information in the local dequeue control area 68 to manage the distributed aspects of the pipe.

The surrogate start of elements (SSE) is a 16-bit, word-aligned field containing the offset, in bytes, from the pipe address (BASE) to the location in the pipe where the dequeue logic finds the next control element to be removed. The surrogate start of elements field is updated by the dequeue logic 62 after each control element is removed from the pipe 56. The surrogate start of elements field is read by, but never written to, by the enqueue logic 60.

The surrogate dequeue status field (SDS) is a 16-bit, word-aligned field containing bits used to inform the enqueue logic 60 of the current state of the pipe, as perceived by the dequeue logic 62. The surrogate start of elements field (SSE) must be written prior to the surrogate dequeue status field (SDS) to preserve the integrity of accesses to the pipe.

SIGNALLING CONTROL AREAS

Figures 15, 16:
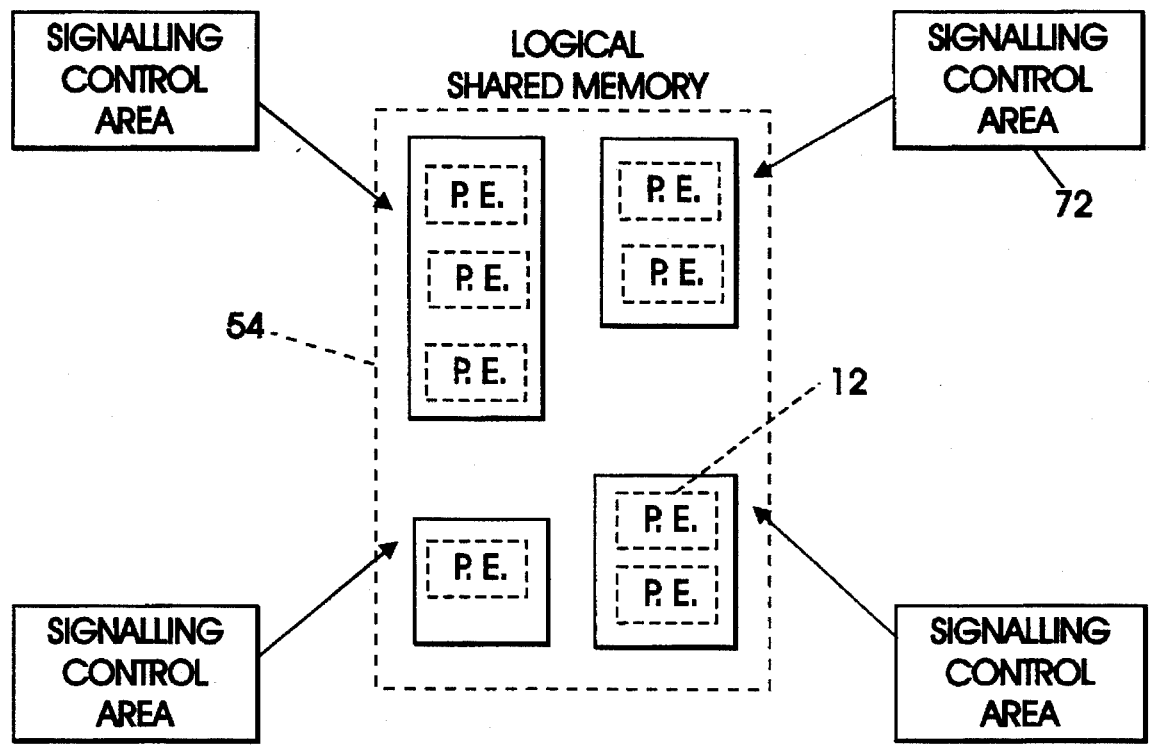
FIG. 15 shows the signalling control areas which are associated with the processing elements in the system.
FIG. 16 illustrates the structure of the signalling control areas of FIG. 15.

Each processing element 12 maintains a signalling control area 72 in logical shared memory 54. As shown in FIG. 15, the signalling control area has a specific area segmented therein for each processing element from which it will receive signals. The signalling control areas provide the means to identify the source of a signal or interrupt and the means for indicating the reason for the signal or interrupt.

FIG. 16 shows the structure of the signalling control area 72. The enqueue field in the signalling control area structure is an 8-bit field. Bits 1–7 of the enqueue field are reserved. Bit 0 indicates that a change in the state of the pipe 56 is being signalled to the enqueue logic 60 by the dequeue logic at the other end of the pipe, e.g., that a control element has been placed in the pipe. The precise reason for the state change may be determined by examining the contents of the surrogate dequeue status field in the surrogate dequeue control area 70.

The management field in the signalling control area 72 is also an 8-bit field. Bits 1–7 of the management field are reserved. Bit 0 is used to indicate a change in the state of the delivery logic at one end of the delivery pipe 56 which requires the attention of the management logic at the other end of the delivery pipe.

The dequeue field in the signalling control area 72 is similarly an 8-bit field. Bits 1–7 of the dequeue field are reserved. Bit 0 is used to indicate that a change in the state of the pipe is being signalled to the dequeue logic 62 by the enqueue logic 60 at the other end of the pipe, e.g., that a control element has been removed from the pipe. The precise reason for the state change may be determined by examining the contents of the surrogate enqueue status field in the surrogate enqueue control area 66.

The enqueue and dequeue protocols operate using status information maintained in logical shared memory and do not require signalling operations. However, for certain implementations and protocols, conditions exist which may necessitate signalling of another processing element when certain status changes in the delivery pipe occur. Some of the conditions which may require signalling are to indicate when a delivery pipe goes from empty to not empty or from not empty to empty; when a delivery pipe goes from not full to full or from full to not full; or when a control element is either placed into or removed from a delivery pipe.

ENQUEUE PROTOCOL

The enqueue protocol defines the operation of the enqueue logic 60 which enqueues control elements in the delivery pipe and manages operation of the pipe. The size of a control element is specified in bytes. Although several control elements may be enqueued by a single invocation of the enqueue operation, all of the control elements enqueued in a single operation must be contiguous in memory. The enqueuing of a control element is a local operation when the delivery pipe 56 is physically located in the sending processing element. The operation involves a push of a control element across the interconnect media when the delivery pipe 56 is located on the receiving processing element. The type of operation (local or distributed) required to access the surrogate start of free and surrogate enqueue status fields depends on where they are located in logical shared memory. To permit tailoring of signalling conditions, options may be selected during system configuration which identify the conditions under which the enqueue logic 60 is to send a signal to the dequeue logic 62 at the other end of the pipe 56.

DEQUEUE PROTOCOL

The dequeue protocol defines the operation of the dequeue logic 62 which dequeues control elements in the delivery pipe and manages operation of the pipe. The dequeuing of a control element is a local operation when the delivery pipe 56 is physically located in the receiving processing element. The operation involves a push of a control element across the interconnect media when the delivery pipe 56 is located on the sending processing element. The type of operation (local or distributed) required to access the surrogate dequeue control areas depends on where they are located in logical shared memory. To permit tailoring of signalling conditions, options may be selected during system configuration which identify the conditions under which the dequeue logic 62 is to send a signal to the enqueue logic 60 at the other end of the pipe 56.

SIMPLE READ OPERATION

The following process occurs when an entity on a second processing element wants to read a control message located in physical memory in a first processing element. The source entity (first processing element) allocates delivery addressable space to be used as the referenced space on the read request, and requests the assignment of a unique identifier for the allocated space. The source entity builds a control element and enqueues the element to the IPC outgoing routing queue on its processing element.

The control element is enqueued to the appropriate delivery pipe, dequeued, and moved by address space management 46 into delivery addressable space 48 on the first processing element. The media space management 50 maps the control element to spaces on the interconnect media 14 in the form of link frames. The link frame containing the control element is sent to the media space management 50 on the destination processing element. The media space management 50 removes the control element from the frame, maps and copies the control element to delivery addressable space. Address space management 46 enqueues the control element to the appropriate pipe 56 on the destination processing element.

Finally, the control element is dequeued onto the appropriate incoming IPC routing queue and routed to the appropriate entity on the destination processing element. The entity may then copy to its physical memory the referenced space in the delivery addressable space corresponding to the location of the control element. Upon completion of the above process, the receiving entity on the destination processing element which requested the delivery enqueues a status control element (reply) back to its IPC 32 for routing to the source entity.

SIMPLE WRITE OPERATION

The following process occurs when an entity on a first processing element wants to write a control message located in its physical memory to a second processing element. The destination entity allocates the delivery addressable space 48 to be used as the referenced space required to receive the write operation, and requests the assignment of a unique identifier for the allocated space. The destination entity sends an event control element to the source entity informing it of the location of the referenced space.

The source entity (first processing element) builds a write request control element and notifies IPC 32 that it needs to send a control message to an entity on the second processing element. The request indicates the length of the control element which the source entity wishes to write to the destination entity. IPC determines by reading the address of the control message that it does not reside on the first processing element and that IDS will be required to write the control element to the destination entity. The outgoing IPC routing queues route the control message to the appropriate IDS pipe.

The control element is enqueued to the appropriate delivery pipe, dequeued, and moved by address space management 46 into delivery addressable space 48 on the first processing element. The media space management 50 maps the control element to spaces on the interconnect media 14 in the form of link frames. The link frame containing the control element is sent to the media space management 50 on the destination processing element. The media space management 50 removes the control element from the frame, maps and copies the control element to delivery addressable space. Address space management 46 enqueues the control element to the appropriate pipe on the destination processing element.

Finally, the control element is dequeued onto the appropriate incoming IPC routing queue and routed to the appropriate entity on the destination processing element. The entity may then copy to its physical memory the referenced space in the delivery addressable space corresponding to the location of the control element. Once the write operation is complete, the destination entity on the receiving processing element returns a status control element (reply) to the source entity indicating that the operation is complete.

Accordingly, an apparatus and method have been described wherein entities on a destination processing element may access and obtain control messages contained in the physical memory of a source processing element by a process in which (i) IDS on the source processing element moves the control message from physical memory therein to address space provided by the IDS on the source processing element, (ii) the control message is copied from the address space on the source processing element to address space on the destination processing element, and (iii) IDS on the destination processing element moves the control message from the address space on the destination processing element to the physical memory on the destination processing element. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

We claim:

1. A computer system, comprising:

a plurality of processing elements, each of said processing elements performing one or more functions through the execution of one or more programs, each of said programs operating asynchronously with respect to executing programs on other processing elements in the system;

interconnection media for interconnecting said plurality of processing elements;

inter-processing communication logic located on each of said processing elements for permitting communication between executing programs on any one of said processing elements; and inter-delivery support hardware located between said interconnection media and said inter-processing communication logic, said inter-delivery support hardware operating asynchronously with respect to said executing programs on said processing elements for (i) enqueuing a control message obtained by a first program on a first processing element from physical memory on said first processing element which is addressable only by programs operating on said first processing element; (ii) temporarily storing said enqueued control message in a first memory device associated with said first processing element; (iii) mapping said temporarily stored control message to first delivery addressable space associated with said first processing element which is addressable by programs operating on a second processing element; (iv) copying over said interconnection media via a copy transaction said mapped control message from said first delivery addressable space to second delivery addressable space associated with said second processing element; (v) moving said copied control message from said second delivery addressable space to a second memory device associated with said second processing element which is addressable only by programs operating on said second processing element; and (vi) dequeuing said moved control message to physical memory on said second processing element.

2. The computer system of claim 1, wherein said interconnection media comprises a local area network.

3. The computer system of claim 1, wherein said interconnection media comprises a serial digital switching network.

4. The computer system of claim 1, wherein said interconnection media comprises a bidirectional computer bus.

5. The computer system of claim 1, wherein said interconnection media comprises a data-cube type network.

6. The computer system of claim 1, wherein said interconnection media comprises a point-to-point mesh network.

7. The computer system of claim 1, wherein said first and second memory devices comprise first-in, first-out (FIFO) buffers.

8. The computer system of claim 7, wherein each processing element has associated therewith one of said FIFO buffers, each of said FIFO buffers including one first-in, first-out pipe for temporarily storing incoming control messages, and one first-in, first-out pipe for temporarily storing outgoing control messages.

9. The computer system of claim 8, wherein said inter-delivery support hardware continuously scans said FIFO buffers for control messages stored therein.

10. The computer system of claim 1, wherein said control messages represent READ and WRITE operations, and wherein more than one control message may be copied over said interconnection media from said first memory device to said second memory device during any one copy transaction.

11. The computer system of claim 1, wherein the operation of said inter-delivery support hardware is asynchronous with respect to programs operating on the same processing element.

12. The computer system of claim 11, wherein inter-delivery support on said second processing element notifies inter-delivery support on said first processing element when a copy transaction has been completed.

13. A method of exchanging control messages between asynchronously operating programs on distinct processing elements connected by an interconnection medium to form a computer system, said method comprising the steps of:

enqueuing a control message obtained from physical memory located on a first processing element, using a first program operating on said first processing element, said physical memory being addressable only by programs operating on said first processing element;

temporarily storing said enqueued control message in a first memory device associated with said first processing element while freeing said first program to continue operating;

mapping said temporarily stored control message to first delivery addressable space associated with said first processing element which is addressable by programs operating on a second processing element;

copying said mapped control message over the interconnect media via a copy transaction to second delivery addressable space associated with said second processing element;

moving said copied control message from said second delivery addressable space associated with said second processing element to a second memory device associated with said second processing element which is addressable only by programs operating on said second processing element; and dequeuing said moved control message from said second memory device to physical memory located on said second processing element.

14. The method of claim 13, wherein said first and second memory devices comprise first-in, first-out (FIFO) buffers.

15. The method of claim 14, wherein each program on a processing element has associated therewith one of said FIFO buffers, each of said FIFO buffers including one first-in, first-out pipe for temporarily storing incoming control messages and one first-in, first-out pipe for temporarily storing outgoing control messages.

16. The method of claim 15, wherein said control messages represent READ and WRITE operations, and wherein more than one control message may be copied over said interconnection media from said first memory device to said second memory device during any one copy transaction.

17. The computer system of claim 15, further comprising the step of notifying said first processing element when a copy transaction has been completed.

18. The computer system of claim 15, wherein FIFO buffers are continuously scanned for control messages stored therein.

* * * * *